United States Patent
Milbert et al.

(10) Patent No.: US 11,004,186 B2
(45) Date of Patent: May 11, 2021

(54) PARCEL CHANGE DETECTION

(71) Applicant: Primitive LLC, Edina, MN (US)

(72) Inventors: Randy Milbert, Edina, MN (US); Andreas Robinson, St. Paul, MN (US)

(73) Assignee: Primitive LLC, Edina, MN (US)

( * ) Notice: Subject to any disclaimer, the term of this patent is extended or adjusted under 35 U.S.C. 154(b) by 140 days.

(21) Appl. No.: 16/136,734

(22) Filed: Sep. 20, 2018

(65) Prior Publication Data

US 2019/0087952 A1 Mar. 21, 2019

Related U.S. Application Data

(60) Provisional application No. 62/561,291, filed on Sep. 21, 2017.

(51) Int. Cl.
*G06T 7/00* (2017.01)
*G06Q 10/06* (2012.01)
(Continued)

(52) U.S. Cl.
CPC ........ *G06T 7/0002* (2013.01); *G06K 9/00637* (2013.01); *G06K 9/00771* (2013.01); *G06K 9/6231* (2013.01); *G06K 9/6267* (2013.01); *G06Q 10/067* (2013.01); *G06Q 10/0637* (2013.01); *G06T 2207/20081* (2013.01); *G06T 2207/30168* (2013.01)

(58) Field of Classification Search
CPC ......... G06T 7/0002; G06T 2207/20081; G06T 2207/30168; G06K 9/00637; G06K 9/00771; G06K 9/6267; G06K 9/6231; G06Q 10/067; G06Q 10/0637
See application file for complete search history.

(56) References Cited

U.S. PATENT DOCUMENTS 10,489,691 B2 * 11/2019 Schrier .................... G06K 9/66
2014/0164264 A1 * 6/2014 Guttman .............. G06Q 30/018
705/313

OTHER PUBLICATIONS

"Charalabos et al., Towards a strategy for contorl of suburban informal buildings through automatic change detection, 2009, Computers, Environment and Urban System 33 (2009), pp. 64-74" (Year: 2009).*

(Continued)

*Primary Examiner* — Ping Y Hsieh
(74) *Attorney, Agent, or Firm* — Schwegman Lundberg & Woessner, P.A.

(57) ABSTRACT

A computer-implemented method for identifying property changes by analyzing differences between old and new imagery. In one embodiment, an administrator begins by creating a project with links to old and new imagery and uploading a file with parcel boundaries. The application may then divide the project into smaller batches and then automatically classify each batch. Analysts may then review these batches and reject those that are insufficiently accurate. For rejected batches, analysts may manually classify the parcels. Analysts may then review these batches again. In one embodiment, once all batches are accepted, the project may be marked as complete and suitable reports may be generated and sent. These reports may include a customer report which may include overall project statistics, a breakdown of changes by type, a heatmap showing which areas are changing fastest, and/or an estimated tax impact of the identified changes.

20 Claims, 40 Drawing Sheets

(51) Int. Cl.
 *G06K 9/62* (2006.01)
 *G06K 9/00* (2006.01)

(56) References Cited

OTHER PUBLICATIONS

"ImageNet", 2016 Stanford Vision Lab, Stanford University, Princeton University, [Online]. [Accessed Jun. 28, 2019]. Retrieved from the Internet: URL: https: web.archive.org web 20180913052255 http: www.image-net.org , 1 pg.

* cited by examiner

| /addproject | 300 |
|---|---|

| /addtasks | 302 |
|---|---|

| /classify | 304 |
|---|---|

| /download | 306 |
|---|---|

| /parcel?action=compare | 308 |
|---|---|
| Analysis Task Id : Long<br>Review Task Id : Long | |

| /parcel?action=view | 310 |
|---|---|
| Task Id : Long | |

| /promote | 312 |
|---|---|

| /users | 314 |
|---|---|

| /user | 316 |
|---|---|
| User Id : String | |

Fig. 3

| /api/download                          400 |
|---|
| Project Id : Long<br>Report : String |

| /api/import                            402 |
|---|
| Address Attributes : List<String><br>Object Name : String<br>Parcel Attribute : String<br>Project Id : Long |

| /api/project                           404 |
|---|
| Name : String<br>New Imagery Layer : String<br>New Imagery Type : String<br>New Imagery Url : String<br>Old Imagery Layer : String<br>Old Imagery Type : String<br>Old Imagery Url : String |

| /api/sendreview                        406 |
|---|
| Analysis Job Id : Long<br>Copy Addresses : List<String><br>Review Job Id : Long<br>To Addresses : List<String> |

| /api/sendupdates                       408 |
|---|

| /api/task?action=add                   410 |
|---|
| Batch Id : Long |

| /api/task?action=compare               412 |
|---|
| Analysis Task Id : Long<br>Review Task Id : Long |

| /api/task?action=edit                  414 |
|---|
| Comment : String<br>End : Date<br>Label : String<br>Start : Date<br>Task Id : Long<br>Types : List<String> |

| /api/task?action=get                   416 |
|---|
| Task Id : Long |

| /api/task?action=next                  418 |
|---|

| /api/user                              420 |
|---|
| Level : Integer<br>User Id : String |

Fig. 4

| Batch 500 |
|---|
| Accepted Analysis Jobs : List<Job><br>Accepted Review Jobs : List<Job><br>Done: Boolean<br>Id : Long<br>Number: Integer<br>Parcels : List<Parcel><br>Project Id : Long<br>Rejected Analysis Jobs : List<Job><br>Rejected Review Jobs : List<Job> |

| Job 502 |
|---|
| Batch Id : Long<br>Created Date : Date<br>Done: Boolean<br>Id : Long<br>Project Id : Long<br>Review : Boolean<br>Task Index : Integer<br>Tasks : List<Task><br>User Id : String |

| Parcel 504 |
|---|
| Address : String<br>Batch Id : Long<br>Id : Long<br>Latitude : Double<br>Longitude : Double<br>Name : String<br>Project Id : Long<br>Points : List<Point> |

| Point 506 |
|---|
| Latitude : Double<br>Longitude : Double |

| Project 508 |
|---|
| Batches : List<Batch><br>Created Date : Date<br>Done : Boolean<br>Id : Long<br>Minimum User Level : Integer<br>Name : String<br>New Imagery Layer : String<br>New Imagery Type : String<br>New Imagery Url : String<br>Old Imagery Layer : String<br>Old Imagery Type : String<br>Old Imagery Url : String |

| Task 510 |
|---|
| Batch Id : Long<br>Comment : String<br>End : Date<br>Id : Long<br>Job Id : Long<br>Label : String<br>Parcel Id : Long<br>Parcel Name : String<br>Project Id : Long<br>Duration : Long<br>Start : Date<br>Types : List<String><br>User Id : String |

| User 512 |
|---|
| Created Date : Date<br>Email : String<br>Id : String<br>Level : Integer<br>Name : String<br>Nickname : String |

Fig. 5

Add Project

1900 Add Project
1902 randy.milbert@primitive.us | Administrator

1904 Project Name (e.g. Hennepin)

1906 Parcel Attribute (e.g. PIN)

1908 Address Attributes (e.g. TAX_ADD_L1, TAX_ADD_L2, TAX_ADD_L3)

1910 Old Imagery (e.g. https://gis.hennepin.us/arcgis/services/Imagery/UTM_Aerial_2009/MapServer/WMSServer?request=GetCapabilities&service=WMS)

1912 Old Map Type
Web Map Tile Service (WMTS)

1914 Old Layer (optional, e.g. duval2016)

1916 New Imagery (e.g. https://gis.hennepin.us/arcgis/services/Imagery/UTM_Aerial_2015/MapServer/WMSServer?request=GetCapabilities&service=WMS)

1918 New Map Type
Web Map Tile Service (WMTS)

1920 New Layer (optional, e.g. duval2017)

1922 + Import Parcels

Fig. 19

Pushpin Review 2300

Overview 2302

Project: Bloomington
Batch: 24
Analyst:
Reviewer:
Total Parcels: 500
Changed Parcels: 35    7%
Unchanged Parcels: 465    93%
Reviewed Parcels: 100    20%
Label Agreement: 92    92%
Types Agreement: 83    83%

Disagreements 2304

| Parcel 2306 | Analyst Label 2308 | Types 2310 | Reviewer Label 2312 | Types 2314 | Comment 2316 |
|---|---|---|---|---|---|
| 053-08027241300054 | changed | new | changed | shed | It looks like they are simply replacing the shingles so you'd ignore that. Due to the mess around the house it's hard to determine if the deck and flatwork is new or not, so in this case I'd only say new shed as there is a new shed near the one in the bottom right side of the property |
| 053-10027241300019 | unchanged | | changed | shed | there is a new shed in the back yard |
| 053-09027241110032 | changed | addition,garage | changed | addition,flatwork | This would be addition and flatwork - It looks as if it's an addition added to the garage and there is new flatwork in the back of the house |
| 053-09027241100016 | changed | deck | changed | deck,flatwork | There is a new deck and the new flatwork is the sidewalk at the base of the stairs leading out to the yard |
| 053-07027241120096 | unchanged | | changed | shed | there is a new shed behind the garage |
| 053-10027241300035 | changed | flatwork | unchanged | | There is no new flatwork. The flatwork in the back of the house is barely visible through the trees. When there are obstructions in the way making it hard to adequately determine if an object is there or not, it should be unchanged |
| 053-11027241240014 | changed | deck,shed | changed | shed | There is only a new shed. You can barely make out the deck on the back of the house through the trees and because the tree is |

Fig. 23

Hillsborough County, Florida 2500

Overview 2502

| | |
|---|---|
| Created | August 3, 2018 |
| Batches | 226 |
| Progress | 33% (136 new, 5 analyzing, 9 analyzed, 2 reviewing, 74 done) |
| Projected Completion | August 24, 2018 (project duration of 21 days) |

Analysts 2504

| Rank | Name | Analyzed | Reviewed | Accuracy | Parcels |
|---|---|---|---|---|---|
| 1 | | 24 | 0 | 98% | 12,000 |
| 2 | | 21 | 0 | 96% | 10,500 |
| 3 | | 16 | 0 | 98% | 8,000 |
| 4 | | 15 | 0 | 96% | 7,500 |
| 5 | | 1 | 64 | 98% | 6,900 |
| 6 | | 8 | 0 | 95% | 4,000 |
| 7 | | 0 | 16 | | 1,600 |
| 8 | | 3 | 0 | 93% | 1,500 |
| 9 | | 2 | 0 | 98% | 1,000 |

Progress 2506

| Date | NK | MC | SC | JS | HS | LK | BK | JK | GP | Total |
|---|---|---|---|---|---|---|---|---|---|---|
| August 10 | 500 | 0 | 0 | 500 | 400 | 0 | 400 | 500 | 0 | 2,300 |
| August 9 | 2,000 | 1,500 | 0 | 1,000 | 700 | 500 | 400 | 0 | 0 | 6,100 |
| August 8 | 2,500 | 2,000 | 500 | 500 | 800 | 500 | 200 | 0 | 0 | 7,000 |
| August 7 | 2,500 | 2,000 | 2,500 | 1,000 | 800 | 500 | 200 | 500 | 0 | 10,000 |
| August 6 | 2,000 | 500 | 500 | 500 | 800 | 500 | 200 | 0 | 0 | 5,000 |
| August 5 | 0 | 500 | 1,000 | 1,500 | 0 | 0 | 0 | 0 | 500 | 3,500 |
| August 4 | 1,000 | 2,500 | 2,500 | 1,000 | 1,000 | 2,000 | 200 | 500 | 500 | 11,200 |
| August 3 | 500 | 1,500 | 500 | 1,000 | 1,100 | 0 | 0 | 0 | 0 | 4,600 |

Fig. 25

2700 Download Report
2702 randy.nilbert@primitive.us | Administrator

Project
2704 Bloomington (incomplete)

Report
2706 Batch

2708 ⬇ Generate

Fig. 27

| analysts | analysisJo analysisJo analysisTa analysisTa batchId batchNum batchDom parcels projectId reviewers reviewJok reviewJok reviewTa reviewTas reviewTas |
|---|---|
| 1 | analysts analysisJo analysisJo analysisTa analysisTa batchId batchNum batchDom parcels projectId reviewers reviewJok reviewJok reviewTas reviewTas reviewTas |
| 2 | 14480008 TRUE 999 1000 5920079 1 TRUE 1000 13100220 18481120 TRUE 99 100 |
| 3 | 20522293 TRUE 999 1000 8940118 2 TRUE 1000 13100220 15861152 TRUE 99 100 |
| 4 | 12270216 TRUE 999 1000 5900151 3 TRUE 1000 13100220 15130220 TRUE 99 100 |
| 5 | 13340002 TRUE 999 1000 8950358 4 TRUE 1000 13100220 13580291 TRUE 99 100 |
| 6 | 4930426 TRUE 999 1000 11110360 5 TRUE 1000 13100220 4910808 TRUE 99 100 |
| 7 | 12240465 TRUE 999 1000 12270455 6 TRUE 1000 13100220 16030912 TRUE 99 100 |
| 8 | 5910499 TRUE 999 1000 15100453 7 TRUE 1000 13100220 16160070 TRUE 99 100 |
| 9 | 8950578 TRUE 999 1000 4880531 8 TRUE 1000 13100220 8990469 TRUE 99 100 |
| 10 | 16020565 TRUE 999 1000 4890514 9 TRUE 1000 13100220 5940507 TRUE 99 100 |
| 11 | 20160164 TRUE 999 1000 8950621 10 TRUE 1000 13100220 15940809 TRUE 99 100 |
| 12 | 16080665 TRUE 999 1000 5890603 11 TRUE 1000 13100220 12290722 TRUE 99 100 |
| 13 | 11130675 TRUE 636 637 5870677 12 TRUE 637 13100220 17011280 TRUE 63 64 |

| | A | B | C | D | E | F | G | H |
|---|---|---|---|---|---|---|---|---|
| 1 | batchId | done | jobId | projectId | review | taskindex | tasks | usersid |
| 2 | 11524452 | TRUE | 11682534 | 11524451 | FALSE | 499 | 500 | 104463900 |
| 3 | 11524452 | TRUE | 16810224 | 11524451 | TRUE | 49 | 50 | 111222482 |
| 4 | 15852082 | TRUE | 15931300 | 11524451 | FALSE | 499 | 500 | 114701859 |
| 5 | 15852082 | TRUE | 16860705 | 11524451 | TRUE | 49 | 50 | 112901960 |
| 6 | 20320021 | TRUE | 11672801 | 11524451 | FALSE | 499 | 500 | 104463900 |
| 7 | 20320021 | TRUE | 13870207 | 11524451 | TRUE | 49 | 50 | 111222482 |
| 8 | 11702271 | TRUE | 20350238 | 11524451 | FALSE | 499 | 500 | 111222482 |
| 9 | 11702271 | TRUE | 14920122 | 11524451 | TRUE | 49 | 50 | 104463900 |
| 10 | 14782182 | TRUE | 18850040 | 11524451 | FALSE | 499 | 500 | 112901960 |
| 11 | 18424487 | TRUE | 20480120 | 11524451 | FALSE | 499 | 500 | 104463900 |
| 12 | 18424487 | TRUE | 23210014 | 11524451 | TRUE | 49 | 50 | 112901960 |
| 13 | 18502201 | FALSE | 17660263 | 11524451 | FALSE | 166 | 500 | 111222482 |
| 14 | 17611243 | TRUE | 21000328 | 11524451 | FALSE | 499 | 500 | 114701859 |
| 15 | 17611243 | TRUE | 19800038 | 11524451 | TRUE | 49 | 50 | 104463900 |
| 16 | 13602159 | TRUE | 24000123 | 11524451 | FALSE | 499 | 500 | 114701859 |
| 17 | 13602159 | TRUE | 19660626 | 11524451 | TRUE | 49 | 50 | 104463900 |
| 18 | 17562284 | TRUE | 20530286 | 11524451 | FALSE | 499 | 500 | 114332117 |
| 19 | 17552256 | FALSE | 24010398 | 11524451 | FALSE | 191 | 500 | 114701859 |
| 20 | 13612297 | TRUE | 19720552 | 11524451 | FALSE | 499 | 500 | 104463900 |
| 21 | 15931002 | FALSE | 25030152 | 11524451 | FALSE | 0 | 500 | 114332117 |
| 22 | 18502272 | TRUE | 21120293 | 11524451 | FALSE | 499 | 500 | 104463900 |

| | A | B | C | D | E | F | G | H |
|---|---|---|---|---|---|---|---|---|
| 1 | Address | batchId | latitude | longitude | parcelId | parcelNar | points | projectId |
| 2 | | 11524452 | 44.79709 | -93.3359 | 20162147 | 053-30027 | -93.33552 | 11524451 |
| 3 | | 11524452 | 44.79863 | -93.3414 | 14782141 | 053-30027 | -93.34117 | 11524451 |
| 4 | | 11524452 | 44.79684 | -93.3407 | 13612178 | 053-30027 | -93.34021 | 11524451 |
| 5 | | 11524452 | 44.79416 | -93.3759 | 11682132 | 053-05115 | -93.37517 | 11524451 |
| 6 | | 11524452 | 44.79806 | -93.3822 | 19492139 | 053-06115 | -93.38116 | 11524451 |
| 7 | | 11524452 | 44.79751 | -93.3328 | 13582192 | 053-30027 | -93.33255 | 11524451 |
| 8 | | 11524452 | 44.79625 | -93.351 | 12671842 | 053-04115 | -93.35064 | 11524451 |
| 9 | | 11524452 | 44.7987 | -93.3365 | 15862124 | 053-30027 | -93.33613 | 11524451 |
| 10 | | 11524452 | 44.79642 | -93.3277 | 12671843 | 053-29027 | -93.32747 | 11524451 |
| 11 | | 11524452 | 44.80822 | -93.3595 | 17572101 | 053-32116 | -93.35935 | 11524451 |
| 12 | | 11524452 | 44.79973 | -93.35 | 16672141 | 053-30027 | -93.34974 | 11524451 |
| 13 | | 11524452 | 44.79415 | -93.3519 | 20192135 | 053-04115 | -93.35153 | 11524451 |
| 14 | | 11524452 | 44.79235 | -93.3714 | 20310876 | 053-05115 | -93.37078 | 11524451 |
| 15 | | 11524452 | 44.80057 | -93.3383 | 11672179 | 053-30027 | -93.33787 | 11524451 |
| 16 | | 11524452 | 44.79902 | -93.3425 | 18424435 | 053-30027 | -93.34231 | 11524451 |
| 17 | | 11524452 | 44.79982 | -93.376 | 14762041 | 053-05115 | -93.37589 | 11524451 |
| 18 | | 11524452 | 44.79668 | -93.3542 | 16672142 | 053-04115 | -93.35396 | 11524451 |
| 19 | | 11524452 | 44.79722 | -93.3355 | 11662174 | 053-30027 | -93.33516 | 11524451 |
| 20 | | 11524452 | 44.8006 | -93.3178 | 20202104 | 053-29027 | -93.31749 | 11524451 |
| 21 | | 11524452 | 44.79558 | -93.3419 | 18482150 | 053-30027 | -93.34162 | 11524451 |
| 22 | | 11524452 | 44.79355 | -93.3584 | 13612180 | 053-04115 | -93.35813 | 11524451 |

| | A | B | C | D | E | F | G | H | I |
|---|---|---|---|---|---|---|---|---|---|
| 1 | batchId | batchNum | done | parcels | projectId | analyst | reviewer | labelAgre | typeAgree |
| 2 | 5920079 | 1 | TRUE | 1000 | 13100220 | | | 0.91 | 0.85 |
| 3 | 8940118 | 2 | TRUE | 1000 | 13100220 | | | 0.97 | 0.94 |
| 4 | 5900151 | 3 | TRUE | 1000 | 13100220 | | | 0.94 | 0.92 |
| 5 | 8950358 | 4 | TRUE | 1000 | 13100220 | | | 0.92 | 0.9 |
| 6 | 11110360 | 5 | TRUE | 1000 | 13100220 | | | 0.93 | 0.88 |
| 7 | 12270455 | 6 | TRUE | 1000 | 13100220 | | | 0.93 | 0.89 |
| 8 | 15100453 | 7 | TRUE | 1000 | 13100220 | | | 0.94 | 0.92 |
| 9 | 4880531 | 8 | TRUE | 1000 | 13100220 | | | 0.91 | 0.89 |
| 10 | 4890514 | 9 | TRUE | 1000 | 13100220 | | | 0.93 | 0.92 |
| 11 | 8950621 | 10 | TRUE | 1000 | 13100220 | | | 0.9 | 0.89 |
| 12 | 5890605 | 11 | TRUE | 1000 | 13100220 | | | 0.9 | 0.88 |
| 13 | 5870677 | 12 | TRUE | 637 | 13100220 | | | 0.984375 | 0.9375 |

| | A | B | C | D | E | F | G |
|---|---|---|---|---|---|---|---|
| 1 | parcel | address | latitude | longitude | sector | label | types |
| 2 | 053-07028 | | 44.92722 | -93.3309 | 7374 | unchanged | |
| 3 | 053-18028 | | 44.91355 | -93.3332 | 7373 | unchanged | |
| 4 | 053-05116 | | 44.88074 | -93.366 | 7169 | unchanged | |
| 5 | 053-18028 | | 44.91465 | -93.3371 | 7373 | changed | addition |
| 6 | 053-18028 | | 44.90613 | -93.3308 | 7372 | unchanged | |
| 7 | 053-18028 | | 44.91427 | -93.3423 | 7273 | unchanged | |
| 8 | 053-18028 | | 44.9126 | -93.3469 | 7273 | unchanged | |
| 9 | 053-18028 | | 44.91118 | -93.3355 | 7373 | unchanged | |
| 10 | 053-07028 | | 44.9236 | -93.3379 | 7374 | unchanged | |
| 11 | 053-18028 | | 44.90744 | -93.3359 | 7372 | unchanged | |
| 12 | 053-07028 | | 44.92669 | -93.3311 | 7374 | unchanged | |
| 13 | 053-07028 | | 44.92168 | -93.3345 | 7374 | unchanged | |
| 14 | 053-18028 | | 44.90794 | -93.3383 | 7372 | changed | addition,f |
| 15 | 053-31028 | | 44.86638 | -93.3482 | 7268 | unchanged | |
| 16 | 053-18028 | | 44.91184 | -93.345 | 7273 | unchanged | |
| 17 | 053-31028 | | 44.8663 | -93.3493 | 7268 | unchanged | |
| 18 | 053-18028 | | 44.91313 | -93.3358 | 7373 | unchanged | |
| 19 | 053-04116 | | 44.87938 | -93.3576 | 7169 | changed | addition |
| 20 | 053-18028 | | 44.91476 | -93.3332 | 7373 | unchanged | |
| 21 | 053-32117 | | 44.89176 | -93.3684 | 7070 | unchanged | |
| 22 | 053-18028 | | 44.91282 | -93.333 | 7373 | unchanged | |
| 23 | 053-06116 | 5005 St Pa | 44.87737 | -93.3701 | 7069 | changed | flatwork |

| | A | B | C | D | E | F | G | H | I | J | K | L | M |
|---|---|---|---|---|---|---|---|---|---|---|---|---|---|
| 1 | batchid | end | jobid | label | parcelid | parcelNar | projectid | review | seconds | start | taskid | types | userid |
| 2 | 5920079 | Sun Aug 2 | 14480008 | unchange | 515488305 | 053-06116 | 131002220 | FALSE | 7 | Sun Aug 2 | 156000049 | | 111222482 |
| 3 | 5920079 | Sun Aug 2 | 14480008 | changed | 471706245 | 053-18028 | 131002220 | FALSE | 6 | Sun Aug 2 | 108900048 | new | 111222482 |
| 4 | 5920079 | Sun Aug 2 | 14480008 | changed | 544566845 | 053-07028 | 131002220 | FALSE | 20 | Sun Aug 2 | 108200050 | deck,flatw | 111222482 |
| 5 | 5920079 | Sun Aug 2 | 14480008 | changed | 473661314 | 053-18028 | 131002220 | FALSE | 15 | Sun Aug 2 | 113800049 | addition,f | 111222482 |
| 6 | 5920079 | Sun Aug 2 | 14480008 | unchange | 512364123 | 053-31117 | 131002220 | FALSE | 8 | Sun Aug 2 | 163300050 | | 111222482 |
| 7 | 5920079 | Sun Aug 2 | 14480008 | unchange | 462444616 | 053-04116 | 131002220 | FALSE | 3 | Sun Aug 2 | 163400048 | | 111222482 |
| 8 | 5920079 | Sun Aug 2 | 14480008 | changed | 535113679 | 053-32117 | 131002220 | FALSE | 16 | Sun Aug 2 | 156200047 | flatwork | 111222482 |
| 9 | 5920079 | Sun Aug 2 | 14480008 | unchange | 485144446 | 053-18028 | 131002220 | FALSE | 8 | Sun Aug 2 | 155400049 | | 111222482 |
| 10 | 5920079 | Sun Aug 2 | 14480008 | unchange | 459470688 | 053-07028 | 131002220 | FALSE | 9 | Sun Aug 2 | 163600048 | | 111222482 |
| 11 | 5920079 | Sun Aug 2 | 14480008 | unchange | 513106441 | 053-04116 | 131002220 | FALSE | 5 | Sun Aug 2 | 172800049 | | 111222482 |
| 12 | 5920079 | Sun Aug 2 | 14480008 | changed | 639584638 | 053-18028 | 131002220 | FALSE | 10 | Sun Aug 2 | 114000050 | flatwork | 111222482 |
| 13 | 5920079 | Sun Aug 2 | 14480008 | unchange | 595188219 | 053-07028 | 131002220 | FALSE | 9 | Sun Aug 2 | 182200051 | | 111222482 |
| 14 | 5920079 | Sun Aug 2 | 14480008 | unchange | 675213821 | 053-18028 | 131002220 | FALSE | 8 | Sun Aug 2 | 144500050 | | 111222482 |
| 15 | 5920079 | Sun Aug 2 | 14480008 | unchange | 551438016 | 053-18028 | 131002220 | FALSE | 4 | Sun Aug 2 | 125100050 | | 111222482 |
| 16 | 5920079 | Sun Aug 2 | 14480008 | unchange | 534924835 | 053-07028 | 131002220 | FALSE | 7 | Sun Aug 2 | 163700048 | | 111222482 |
| 17 | 5920079 | Sun Aug 2 | 14480008 | unchange | 555536356 | 053-18028 | 131002220 | FALSE | 5 | Sun Aug 2 | 173200049 | | 111222482 |
| 18 | 5920079 | Sun Aug 2 | 14480008 | unchange | 656225796 | 053-07028 | 131002220 | FALSE | 6 | Sun Aug 2 | 144900049 | | 111222482 |
| 19 | 5920079 | Sun Aug 2 | 14480008 | unchange | 615170125 | 053-18028 | 131002220 | FALSE | 11 | Sun Aug 2 | 144700050 | | 111222482 |
| 20 | 5920079 | Sun Aug 2 | 14480008 | unchange | 607245051 | 053-07028 | 131002220 | FALSE | 5 | Sun Aug 2 | 155500050 | | 111222482 |
| 21 | 5920079 | Sun Aug 2 | 14480008 | unchange | 466507565 | 053-18028 | 131002220 | FALSE | 8 | Sun Aug 2 | 108400050 | | 111222482 |
| 22 | 5920079 | Sun Aug 2 | 14480008 | unchange | 479248315 | 053-18028 | 131002220 | FALSE | 4 | Sun Aug 2 | 108800049 | | 111222482 |
| 23 | 5920079 | Sun Aug 2 | 14480008 | changed | 509669005 | 053-07028 | 131002220 | FALSE | 13 | Sun Aug 2 | 155600050 | shed | 111222482 |

Fig. 37

| | A | B | C | D | E | F |
|---|---|---|---|---|---|---|
| 1 | email | joined | level | name | nickname | userId |
| 2 | | 28-Aug-17 | 1 | | | 101395051 |
| 3 | | 1-Sep-17 | 1 | | | 101510794 |
| 4 | | 28-Jul-17 | 3 | | | 101775531 |
| 5 | | 26-Aug-17 | 1 | | | 104463900 |
| 6 | | 1-Sep-17 | 1 | | | 104791929 |
| 7 | | 3-Sep-17 | 0 | | | 105064673 |
| 8 | | 28-Jul-17 | 3 | | | 106157622 |
| 9 | | 4-Sep-17 | 0 | | | 108639978 |
| 10 | | 28-Jul-17 | 3 | | | 110784015 |
| 11 | | 28-Jul-17 | 2 | | | 111222482 |
| 12 | | 30-Jul-17 | 2 | | | 112901960 |
| 13 | | 3-Sep-17 | 1 | | | 112917043 |
| 14 | | 1-Sep-17 | 1 | | | 113221640 |
| 15 | | 28-Jul-17 | 3 | | | 114128282 |
| 16 | | 25-Aug-17 | 1 | | | 114332117 |
| 17 | | 1-Sep-17 | 1 | | | 114647771 |
| 18 | | 24-Aug-17 | 1 | | | 114701859 |
| 19 | | 2-Sep-17 | 1 | | | 116253588 |
| 20 | | 1-Sep-17 | 0 | | | 116486870 |
| 21 | | 28-Jul-17 | 3 | | | 116637815 |

PARCEL CHANGE DETECTION

CROSS-REFERENCE TO RELATED APPLICATIONS

This application claims priority to U.S. provisional application No. 62/561,291, titled "Parcel Change Detection," filed Sep. 21, 2017, the entire content of which is hereby incorporated herein by reference.

FIELD OF THE INVENTION

The present disclosure relates to detecting changes in imagery. Particularly, the present disclosure relates to identifying property changes by analyzing differences between old and new imagery.

BACKGROUND OF THE INVENTION

The background description provided herein is for generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Cities and counties derive much of their operating revenue from property taxes. As a result, they are keenly interested in increasing property taxes when residents improve their home or property. Typically, an assessment office within the city or county is responsible for doing this. The assessment office uses several approaches to keep track of property improvements.

One approach is the permitting process. Cities and counties often require that homeowners obtain a permit before making many types of home or property improvements. An assessor may visit the home once the improvement is complete. At that time, the assessor will estimate the value of the improvement and update the home's market value accordingly. A higher market value will result in higher property taxes. Unfortunately for the assessment office, however, not everyone obtains a permit before making property improvements. In addition, in some cities and counties, one does not need a permit to make certain improvements such as adding an agricultural building on a property. Therefore, assessors need other means of identifying property changes.

Another approach is sending assessors into the field. Assessors drive around the city or county looking for property improvements. The assessor might have an old photograph of a house that he or she can use for comparison. This process is slow and labor intensive. Also, it can be hard to assess changes that are not visible from the street such as a new deck or pool. An assessor might get out of his or her car to walk around the property, but this can be difficult and dangerous. The homeowner may have a fence or a dog. Therefore, in many cases, the assessor will not leave his or her car.

One way that assessors reduce their costs is by hiring a company with specially-equipped vehicles and lower-cost employees who drive through the city or county on their behalf. Each vehicle has a roof-mounted camera that automatically captures images of the fronts of homes on both side of the street. An advantage of this approach is that one can use lower-cost labor to capture the imagery. Higher-cost assessors can then review this imagery at their leisure and from the safety of their office. Nonetheless, this is still a labor-intensive and expensive process because the assessor must pay for imagery collection and must manually inspect every property in the city or county to find changes. Also, the assessor will have no way to detect changes that are not visible from the street.

Another way that assessors reduce their costs is by hiring a company with specially-equipped airplanes that collect overhead imagery of all properties in a city or county. Airplanes and pilots are expensive, but planes move quickly, so they can capture imagery of an entire city or county relatively quickly. Once again, the assessors can review this imagery at their convenience from their office. This approach is still labor-intensive and expensive, however, because the assessor must pay for imagery collection and must manually inspect every property in the city or county to find changes. Also, the assessor will have no way to detect changes that are not visible from overhead.

A further improvement on the previous process is capturing not just overhead imagery, but also oblique imagery. Doing so provides an assessor with an overhead view of each property, but also views at a 45° angle showing the property from the north, east, south, and west. This is a significant improvement over overhead imagery alone, because oblique imagery tends to be easier for humans to interpret. In an overhead image, it may be hard to tell if a structure on the back of a house is a patio or a deck, but it is usually obvious in an oblique image. Also, with overhead imagery it is usually impossible to tell if a homeowner added a second level to his or her house. With oblique imagery, this is easy to see. Even with these improvements, however, the assessor still has a time-consuming and labor-intensive job ahead of him or her. Someone needs to look at each property in the new imagery—now from five different angles—and compare that to previous imagery of the property.

One of the market leaders in collecting oblique imagery for assessors currently addresses this problem by offering a service where they manually go through old and new imagery and identify properties that have changed. First, analysts manually outline all structures in the old imagery. Next, analysts manually outline all structures in the new imagery. Finally, analysts manually compare these outlines and mark the parcels as changed or unchanged. The company then delivers a spreadsheet with these results to the assessment office. This process is expensive and labor-intensive and can take months to complete. Also, this process misses non-building changes that affect assessed value including a new deck, flatwork, patio, pool, sauna, or spa. It also misses changes that minimally impact the building outline such as a teardown that utilizes the previous foundation. Nonetheless, assessment offices pay for this service because it reduces the burden on their team and helps them focus on just the properties that have changed instead of the majority which have not.

What is needed is a parcel change detection approach that captures more, substantially all, or all changes relevant to property assessment and that is accurate, relatively inexpensive, and fast.

BRIEF SUMMARY OF THE INVENTION

The following presents a simplified summary of one or more embodiments of the present disclosure to provide a basic understanding of such embodiments. This summary is not an extensive overview of all contemplated embodiments, and is intended to neither identify key or critical elements of all embodiments, nor delineate the scope of any or all embodiments.

The present disclosure, in one embodiment, is a computer-implemented method for accurately and efficiently identifying property changes by analyzing differences between old and new imagery. In one embodiment, an administrator begins by creating a project. The administrator may then upload a file with parcel boundaries. The administrator may also specify which parcel attribute in the file specifies the parcel's identifier and which parcel attributes specify a parcel's address. The administrator may also specify web addresses for obtaining old and new imagery covering the parcels. In one embodiment, the application then divides the project into smaller batches. Next, the application may automatically classify each batch and make these batches available for manual review. The classification may indicate whether the parcel is changed or unchanged. The classification may also include a list of change types. In one embodiment, each review batch contains a random sampling of the parcels that were in the analysis batch. For each review batch, a reviewer may manually classify the selected parcels. In one embodiment, if the reviewer disagrees with the automatic classification or analyst's manual classification, the application prompts the reviewer for a comment explaining why. In one embodiment, when the reviewer is done with the batch, the application compares the system/analyst and reviewer classifications. The application may then accept batches with a classification agreement percentage above a threshold and reject the remaining batches. The application may then make rejected batches available for manual classification. Analysts may then manually classify the parcels within each of these rejected batches. In one embodiment, after an analyst completes a batch, a reviewer inspects a random sample of the parcels as described above and the application accepts or rejects the batch as described above. For each completed review, the application may send a review report to the analyst, reviewer, and administrator. The review report may include details such as the number of parcels reviewed and the classification agreement percentage. The review report may also list parcel disagreement details including the reviewer's comments to promote learning. In one embodiment, once the application has accepted all batches, the application marks the project as complete. At this point, the administrator may download relevant reports and distribute them to the client. These reports may include a customer report which may include statistics such as the total number of parcels and the percentage that were changed. It may also include a breakdown by change type, a heatmap showing which areas within the city or county changed most, and an estimated tax impact of the identified changes. To facilitate field assessor assignment, the customer report may also divide the results into geographic sectors. Each sector may include a map and a list of changed parcels with addresses.

The present disclosure, in another embodiment, is a computer-implemented of identifying property changes. The method may include obtaining a first and second imagery of a property from identified electronic sources and using computer processing components to automatically classify the property based on a comparison of the first and second imagery. The computer processing components may automatically classify a property to indicate whether the property has changed. If the property is classified as having changed, the method may include indicating a property change type for the property. In some embodiments, automatically classifying the property may include removing pixels outside of predetermined boundaries of the property from the first and second imagery. In some embodiments, automatically classifying the property may include combining bands from the first and second imagery to construct a third imagery. The method may also include training the computer processing components to automatically classify using training imagery and classifications for manually classified properties. The training imagery may be augmented using one or more of the following techniques: adding random warping, adding random translation, adding random scaling, adding random rotation, randomly transposing, randomizing contrast, and randomly blurring the training imagery. In some embodiments, the method may include displaying on an electronic display information relating to a tax impact of a change to the property.

The present disclosure, in still another embodiment, is a computer-implemented method of identifying property changes including obtaining a first and second imagery of a property from identified electronic sources, displaying on an electronic display to a user the first and second imagery for the property, and electronically receiving from the user through electronic means a classification of the property. The classification of the property may be indicative of whether the property has changed. If the classification identifies the property has changed, the method may further include electronically receiving from the user a property change type. In scaled embodiments, the method may include repeating the steps of a) obtaining a first and second imagery of a property, b) displaying on an electronic display to a user the first and second imagery for the property, and c) electronically receiving from the user through electronic means a classification of the property for each of a plurality of properties. Such method may further include providing a subset of classified properties of the plurality of properties classified for review by at least one user and accepting or rejecting the plurality of properties classified based on the review of the subset of classified properties. If the plurality of properties is rejected, the method may include reclassifying the plurality of properties. Additionally, the method may include displaying a map on an electronic display to a user, the map identifying classifications for at least a subset of the plurality of properties. The map may include a marker for each changed property of the at least a subset of the plurality of properties and each marker may be colored to indicate a change type corresponding to the respective property. The map may also distinguish areas of the map based on amount of change in each area. In some embodiments, the method may include displaying on an electronic display information relating to change types of the at least a subset of the plurality of properties.

The present disclosure, in yet another embodiment, is a computer-implemented method of identifying property changes include obtaining a first and second imagery from identified electronic sources for each property of a plurality of properties and using computer processing components to automatically classify each property based on a comparison of the first and second imagery corresponding to the property. The method may include dividing the classified properties into batches, and for at least one batch, providing a subset of classified properties of the batch for review by at least one user and accepting or rejecting the whole batch based on the review of the subset of classified properties. The method may also include reclassifying rejected batches. In some embodiments, the method may include displaying a map on an electronic display to a user, the map identifying classifications for at least a subset of the plurality of properties. The map may include a marker for each changed property of the at least a subset of the plurality of properties and each marker may be colored to indicate a change type corresponding to the respective property. The map may also distinguish areas of the map based on amount of change in each area.

Various embodiments of the present disclosure may enable parcel change detection that is more accurate than competing methods and may do so at a lower cost and in a fraction of the time. Various embodiments of the present disclosure may also provide a richer deliverable to clients that helps them geographically divide and intelligently prioritize fieldwork.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

FIG. 3 is a listing of pages of an embodiment of the present disclosure.

FIG. 4 is a listing of services in an embodiment of the present disclosure.

FIG. 5 is a listing of models in an embodiment of the present disclosure.

FIG. 19 is a screenshot of a page for adding a project in an embodiment of the present disclosure.

FIG. 23 is a screenshot of a review e-mail in an embodiment of the present disclosure.

FIG. 25 is a screenshot of a daily project update e-mail in an embodiment of the present disclosure.

FIG. 27 is a screenshot of a page for downloading project information and results in an embodiment of the present disclosure.

FIG. 28 is a screenshot of a batch report in an embodiment of the present disclosure.

FIG. 29 is a first screenshot of a customer report in an embodiment of the present disclosure.

FIG. 30 is a second screenshot of a customer report in an embodiment of the present disclosure.

FIG. 33 is a screenshot of a job report in an embodiment of the present disclosure.

FIG. 34 is a screenshot of a parcel report in an embodiment of the present disclosure.

FIG. 35 is a screenshot of a quality report in in an embodiment of the present disclosure.

FIG. 36 is a screenshot of a result report in an embodiment of the present disclosure.

FIG. 37 is a screenshot of a task report in an embodiment of the present disclosure.

FIG. 38 is a screenshot of a user report in an embodiment of the present disclosure.

DETAILED DESCRIPTION

The present disclosure relates to novel and advantageous systems and methods for detecting changes in imagery. In particular, the present disclosure relates to novel and advantageous systems and methods for identifying property changes by analyzing differences between old and new imagery.

Figure 1:
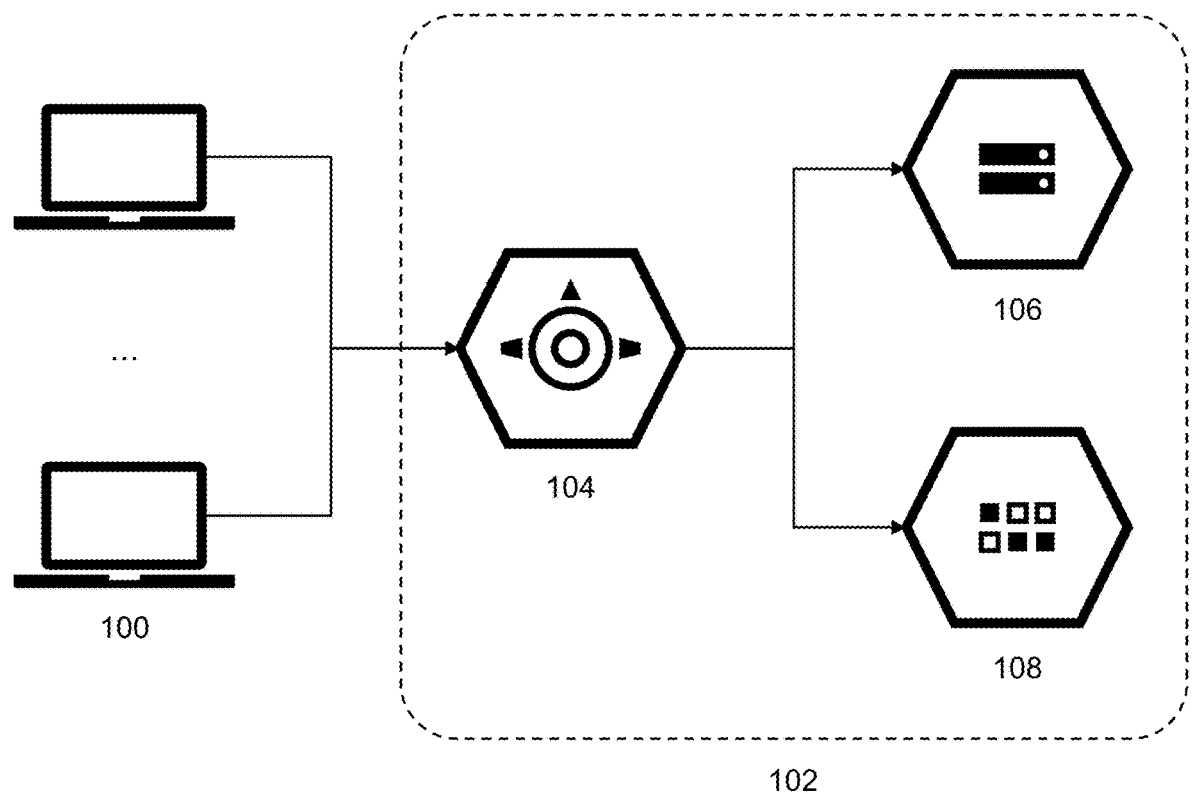
FIG. 1 is a diagram of a system for identifying property changes by analyzing differences between old and new imagery, according to an embodiment of the present disclosure.

FIG. 1 is a system diagram illustrating an embodiment of the present disclosure. In it, one or more clients 100 may access the application using a web browser which may be running on a computer, tablet, etc. The application may run on one or more servers that are on-premises or in cloud computing architecture ("the cloud") 102. The on premise or cloud device(s) 102 may contain app engine 104, storage or cloud storage 106, and datastore or cloud datastore 108 services. The app engine 104 may be communicatively connected with storage 106 and datastore 108. The app engine 104 may respond to requests from clients 100 and may access information via the storage 106 and/or datastore 108 services. One skilled in the art will recognize that the client-side application(s) could run on a desktop (e.g., as a standalone software product), in a web browser (e.g., as a web-based or web-accessible software program), etc. Also, the server-side application(s) could run on any computer accessible by one or more clients. If the server-side application(s) ran in the cloud, it/they could work with any cloud provider such as, but not limited to, Amazon Web Services, Google Cloud Platform, or Microsoft Azure. Also, for the server application(s), one could use any platform that supports running an application and storing information. If the client-side application(s) is/are web-based, it/they may be implemented using a variety of technologies including, but not limited to, JavaScript, HTML, and CSS. If the client-side application(s) is/are desktop-based, it/they may be implemented using a variety of languages including, but not limited to, Java, or C #. The server-side application(s) may be implemented in a variety of languages including, but not limited to, Java or C #.

Not to be limited by the foregoing, any one or more of the hardware and software components of the present disclosure may be integral portions of a single computer, server, or controller, or may be connected parts of a computer network. The hardware and software components may be located within a single location or, in other embodiments, portions of the hardware and software components may be divided among a plurality of locations and connected directly or through a global computer information network, such as the internet. Accordingly, aspects of the various embodiments of the present disclosure can be practiced in distributed computing environments where certain tasks are performed by remote processing devices that are linked through a communications network. In such a distributed computing environment, program modules may be located in local and/or remote storage and/or memory systems.

Figure 2:
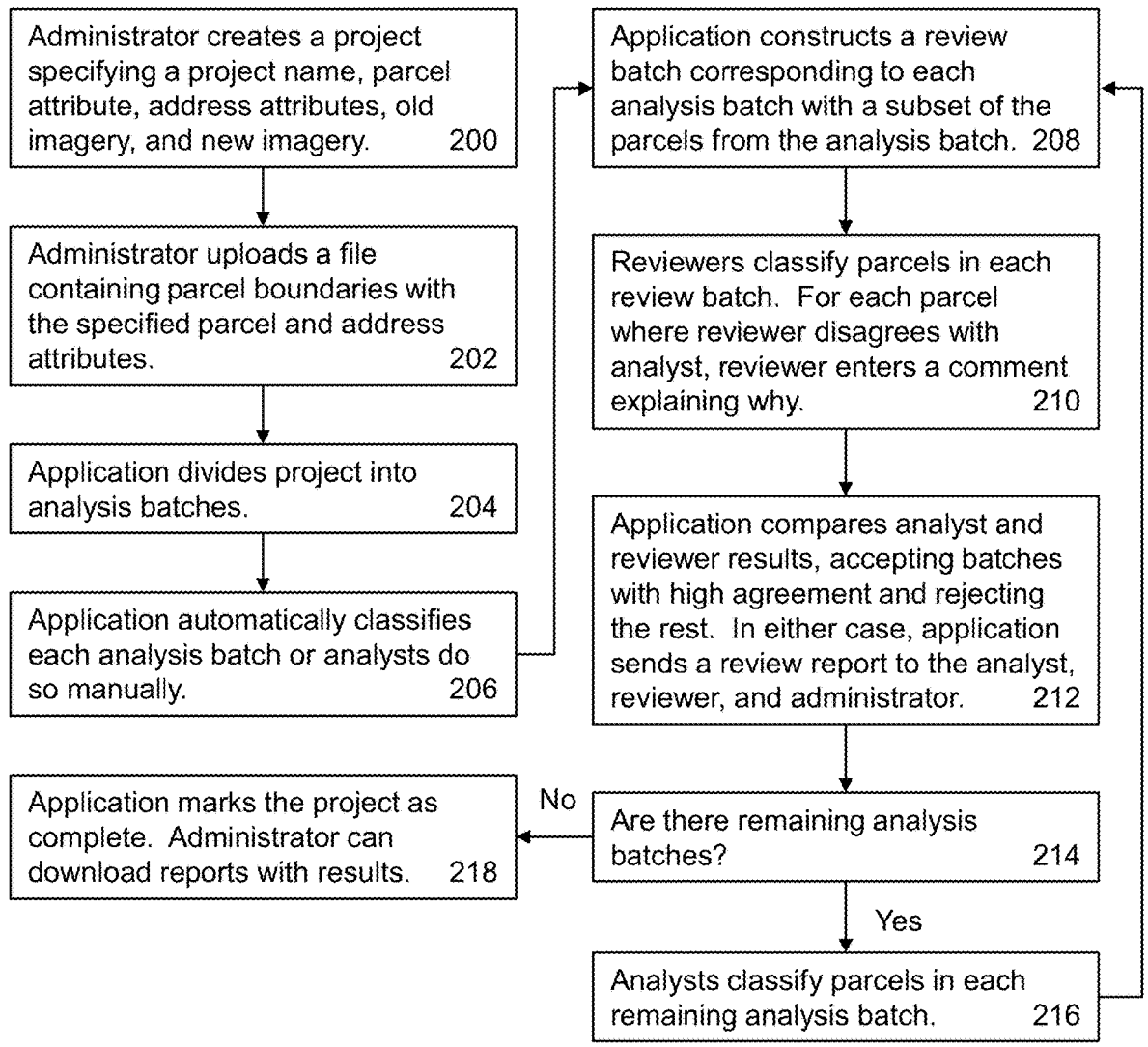
FIG. 2 is a general overview flowchart for a method of identifying property changes by analyzing differences between old and new imagery, according to an embodiment of the present disclosure.

FIG. 2 is a non-limiting overview flowchart for a method of an embodiment of the present disclosure. In it, an administrator may begin at step 200 by creating a project. A project may contain one or more parcels. For example, if a city or county is interested in identifying parcel changes, the project may contain all the parcels in that jurisdiction. The administrator may specify one or more of a project name, parcel identifier attribute, address attributes, old imagery layer, old imagery type, old imagery source or URL, new imagery layer, new imagery type, and new imagery source or URL. For example, the project name may be "Hennepin", the parcel identifier attribute may be "PIN" (where each parcel has a PIN attribute indicating its parcel identifier), the parcel address attributes may be "TAX_ADD_L1, TAX_ADD_L2, TAX_ADD_L3" (where each parcel has a street address, city, and state indicated by these attributes), the old imagery layer may be blank (indicating that the application should use a predetermined default layer), the old imagery type may be "Web Map Service (WMS)", the old imagery URL may be, for example, "https://gis.hennepin.us/arcgis/services/Imagery/UTM_Aerial_2009/MapServer/WMSServer?request=GetCapabilities&service=WMS", the new imagery layer may be blank (indicating that the application should use a predetermined default layer), the new imagery type may be "Web Map Service (WMS)", and the new imagery URL may be, for example, "https://gis.hennepin.us/arcgis/services/Imagery/UTM_Aerial_2015/MapServer/WMSServer?request=GetCapabilities&service=WMS".

Each imagery URL may be a link to a Web Map Service (WMS), Web Map Tile Service (WMTS), ArcGIS Image Service, tile service, or some other map service. One skilled in the art will recognize that any imagery source would be suitable. The imagery type would be the corresponding imagery type of the respective map service. In some embodiments, the imagery type may be automatically determined by the application, for example, based on the imagery source or URL. At step 202, an administrator may upload a file containing one or more parcel boundaries with the specified parcel identifier and address attributes. This may be a Keyhole Markup Language (KML) or Shapefile (SHP) file or any other of a variety of suitable formats. At step 204, the application may divide the project's parcels into smaller analysis batches. These batches may contain any number of parcels, such as but not limited to up to 500 or 1,000. However, any number of parcels per batch can be utilized with the embodiments of the present disclosure. At step 206, the application may automatically classify each analysis batch or analysts may do so manually. Classification may involve indicating whether a parcel is changed or unchanged. For changed parcels, it may also involve indicating one or more change type (e.g., but not limited to, new construction, demolition, new deck, new pool, etc.). In one embodiment of the present disclosure, users may have assigned roles such as trainee, analyst, reviewer, or administrator. A trainee may be learning how to use the system and only allowed to classify parcels in training projects. An analyst may be allowed to classify parcels in production projects for paying customers. A reviewer may alternatively or additionally be allowed to review parcels classified automatically or manually. An administrator may alternatively or additionally be allowed to add and promote users, create projects, download project results, etc. At step 208, the application may construct a review batch corresponding to each analysis batch with a subset of the parcels from the analysis batch. For example, the application may randomly select 20% or other suitable percentage (such as 5%, 10%, or 30%) of the parcels from each analysis batch where, for example, half or other suitable amount thereof were marked as changed and half, or the remainder, were marked as unchanged. At step 210, reviewers may manually review and/or classify parcels in each review batch. For each parcel where the reviewer disagrees with the system's or analyst's classification, the application may prompt the reviewer to enter a comment explaining why. At step 212, the application may compare system/analyst and reviewer results, accepting batches with high agreement and rejecting the rest. For example, the application might accept batches where at least 95% or other suitable percentage (such as 90% or 98%) of the reviewer's changed/unchanged classification matches that of the system/analyst. After accepting or rejecting a batch, the application may send a review report to any or all of the analyst, reviewer, and administrator. At step 214, the application may determine whether there are any remaining analysis batches that the application has not yet accepted. If there are remaining batches, the application may proceed to step 216 where analysts may classify the parcels in each remaining analysis batch. After that, the application may return to step 208 to construct review batches for these newly analyzed batches. If there were no remaining analysis batches at step 214, the application may proceed to step 218 and mark the project as complete. At this point, an administrator may login to download reports with project results.

FIG. 3 lists pages or screens that may be present in an embodiment of the disclosure. An /addproject page 300 may enable an administrator to add a project (see FIG. 6 and FIG. 19). An /addtasks page 302 may enable an analyst to add tasks to analyze or review a batch (see FIG. 7 and FIG. 20). A /classify page 304 may enable an analyst to manually mark parcels as changed or unchanged and specify one or more changed types (see FIG. 10 and FIG. 21). A /download page 306 may enable an administrator to download reports (see FIG. 15 and FIG. 27). A /parcel?action=compare page 308 may enable a user to view old and new imagery of a parcel and compare analyst and reviewer classifications for the parcel (see FIG. 12 and FIG. 24). It may accept analysis and review task identifiers to facilitate loading the relevant classifications. A /parcel?action=view page 310 may enable a user to view old and new imagery of a parcel and view the parcel's classification. It may accept a task identifier to facilitate loading the relevant classification. A /promote page 312 may enable an administrator to promote a user (e.g., to trainee, analyst, reviewer, or administrator) (see FIG. 14 and FIG. 26). A /users page 314 may enable one to view details for all users (see FIG. 17 and FIG. 39). A /user page 316 may enable one to view details for one user (see FIG. 18 and FIG. 40). It may accept a user identifier to facilitate loading the relevant user's information. The pages or screens identified in FIG. 3 are not limiting in that fewer or greater pages or screens may be used for any embodiment of the present disclosure. Likewise, any given page or screen may be divided or sub-divided into multiple of pages or screens, and the functionality of any plurality of pages or screens may alternatively be combined into a single page or screen.

FIG. 4 lists services that may be present in an embodiment of the disclosure. An /api/download service 400 may facilitate generating and downloading reports. It may accept a project identifier and report name. An /api/import service 402 may facilitate uploading a parcel file. It may accept an address attributes list, an object name, a parcel identifier attribute, and a project identifier. An /api/project service 404 may facilitate constructing a project. It may accept one or more of a project name, a new imagery layer, a new imagery type, a new imagery URL, an old imagery layer, an old imagery type, and an old imagery URL. An /api/sendreview service 406 may facilitate sending a review when a reviewer finishes reviewing a batch. It may accept an analyst job identifier, a copy address list, a review job identifier, and a to address list. An /api/sendupdates service 408 may facilitate sending daily project updates to the administrator and project contributors. An /api/task?action=add service 410 may facilitate adding tasks for analyzing or reviewing a batch. It may accept a batch identifier. An /api/task?action=compare service 412 may facilitate obtaining information regarding two tasks to facilitate comparison. It may accept an analysis task identifier and a review task identifier. An /api/task?action=edit service 414 may facilitate updating a task when an analyst classifies a parcel. It may accept a comment, classification end time, label (e.g. changed or unchanged), classification start time, task identifier, and/or change type list (e.g. addition or pool). An /api/task?action=get service 416 may facilitate getting information about one task to facilitate display. It may accept a task identifier. An /api/task?action=next service 418 may facilitate getting the next task in a batch when an analyst is analyzing or reviewing a batch. An /api/user service 420 may facilitate setting a user's level (e.g., 0 for trainee, 1 for analyst, 2 for reviewer, or 3 for administrator). The services identified in FIG. 4 are not limiting in that fewer or greater services may be used for any embodiment of the present disclosure. Likewise, any given service may be divided or sub-divided into multiple of services, and the functionality of any plurality of services may alternatively be combined into a single service.

FIG. 5 lists data models or objects that may be present in an embodiment of the disclosure. A batch model 500 may include, but is not limited to, one or more of an accepted analysis job list (listing analysis jobs that passed a review), an accepted review jobs list (listing review jobs associated with analysis jobs that passed a review), a done value (indicating whether the batch is done), a batch identifier, a batch number, a parcel list, a project identifier, a rejected analysis job list (listing analysis jobs that failed a review), and a rejected review job list (listing review jobs associated with analysis jobs that failed a review). A job model 502 may include, but is not limited to, one or more of a batch identifier, a created date, a done value (indicating whether the job is done), a job identifier, a project identifier, a review value (indicating whether this is an analysis or review job), a task index (indicating the current task within the job), a task list (where there is one task for each parcel), and a user identifier. A parcel model 504 may include, but is not limited to, one or more of an address, batch identifier, parcel identifier, latitude, longitude, parcel name, project identifier, and point list (indicating the parcel boundary). A point model 506 may include, but is not limited to, one or more of a latitude and longitude. A project model 508 may include, but is not limited to, one or more of a batch list, a created date, a done value (indicating whether the project is done), a project identifier, a minimum user level (indicating whether, for example, trainees are allowed to work on this project), a project name, a new imagery layer, a new imagery type, a new imagery source or URL, an old imagery layer, an old imagery type, and an old imagery source or URL. A task model 510 may include, but is not limited to, one or more of a batch identifier, comment (providing feedback if a reviewer disagrees with an analyst's parcel classification), end time, task identifier, job identifier, label (e.g. changed or unchanged), parcel identifier, parcel name, project identifier, duration, start time, change type list (e.g., deck or shed), and a user identifier. A user model 512 may include, but is not limited to, one or more of a created date, an e-mail address, a user identifier, a user level (e.g., 0 for trainee, 1 for analyst, 2 for reviewer, or 3 for administrator), a name, and a nickname. The data models or objects identified in FIG. 5 are not limiting in that fewer or greater data models or objects may be used for any embodiment of the present disclosure. Likewise, any given data model or object may be divided or sub-divided into multiple of data models or objects, and the functionality of any plurality of data models or objects may alternatively be combined into a data model or object.

Figure 6:
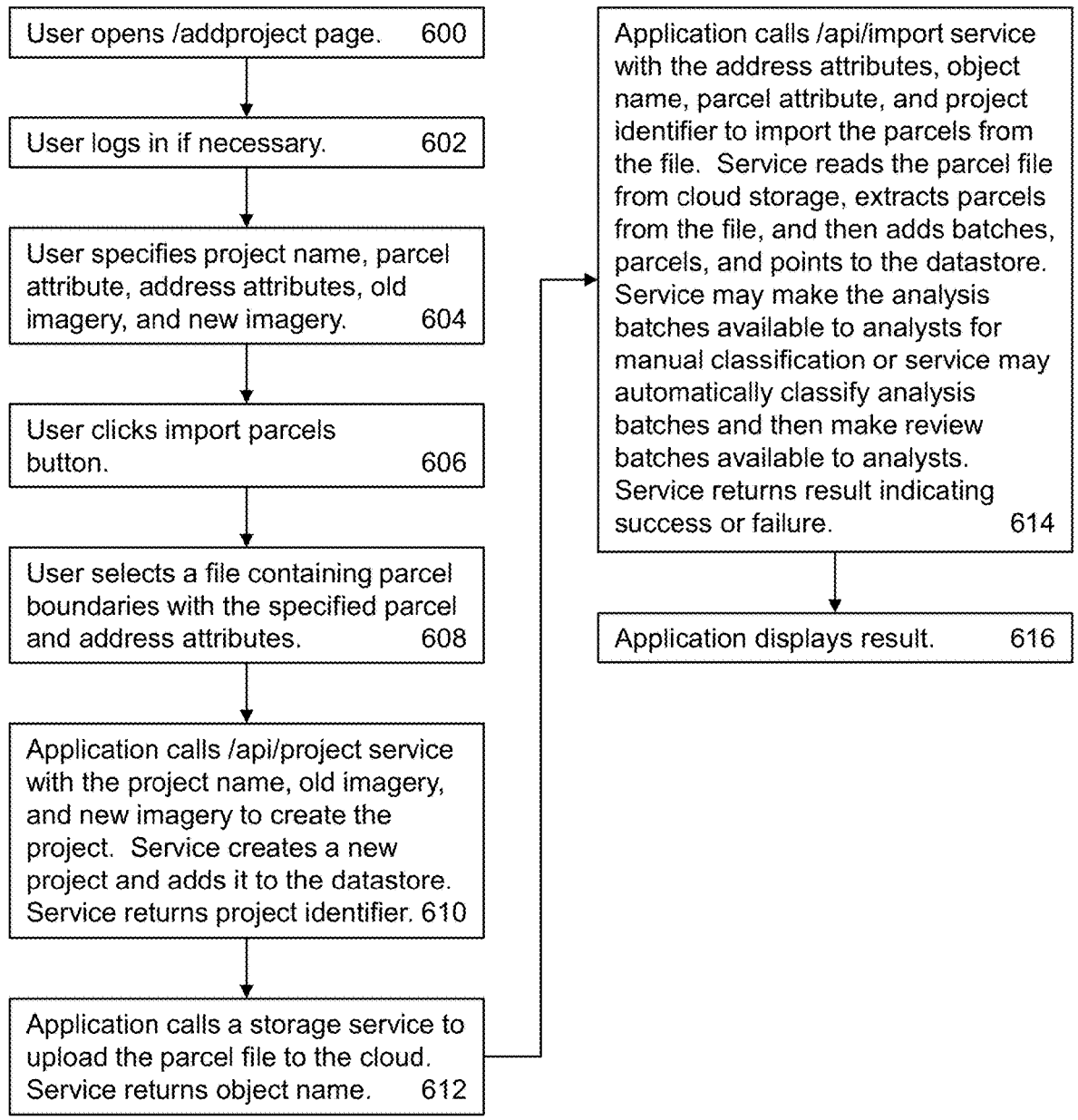
FIG. 6 is a flowchart for adding a project in an embodiment of the present disclosure.

Expanding on steps 200-204 of the general overview in FIG. 2, FIG. 6 is a flowchart for a method of creating or adding a project in an embodiment of the present disclosure. A user may begin at step 600 by opening an /addproject page 300. At step 602, the user may login if necessary. At step 604, the user may specify one or more of a project name, parcel identifier attribute, address attributes, old imagery layer, old imagery type, old imagery source or URL, new imagery layer, new imagery type, and new imagery source or URL. At step 606, the user may click an "import parcels" button or the like to begin the process of uploading a file containing information about parcels to analyze during the project. At step 608, the user may select a file containing parcel boundaries with the specified parcel identifier and address attributes. At step 610, the application may call the /api/project service 404 with the corresponding one or more of the project name, old imagery layer, old imagery type, old imagery source or URL, new imagery layer, new imagery type, and new imagery source or URL to create the project. The service may create a new project with the corresponding data and add it to the datastore 108. The service may return a project identifier. At step 612, the application may call cloud storage 106 service to upload the parcel file to the storage. The service may return an object name. At step 614, the application may call the /api/import service 402 with the corresponding one or more of address attributes, object name, parcel attribute, and project identifier to import the parcels from the file. The service may read the parcel file from storage 106, extract parcels from the file, and then add batches, parcels, and points to the datastore 108. The service may make the analysis batches available to analysts for manual classification or the service may automatically classify analysis batches and then make the review batches available to reviewers for manual review. The service may then return a result indicating success or failure (e.g., if an error occurred while attempting to update the datastore 108). At step 616, the application may display the result (e.g., indicating that the project was added or displaying the error message).

Figure 7:
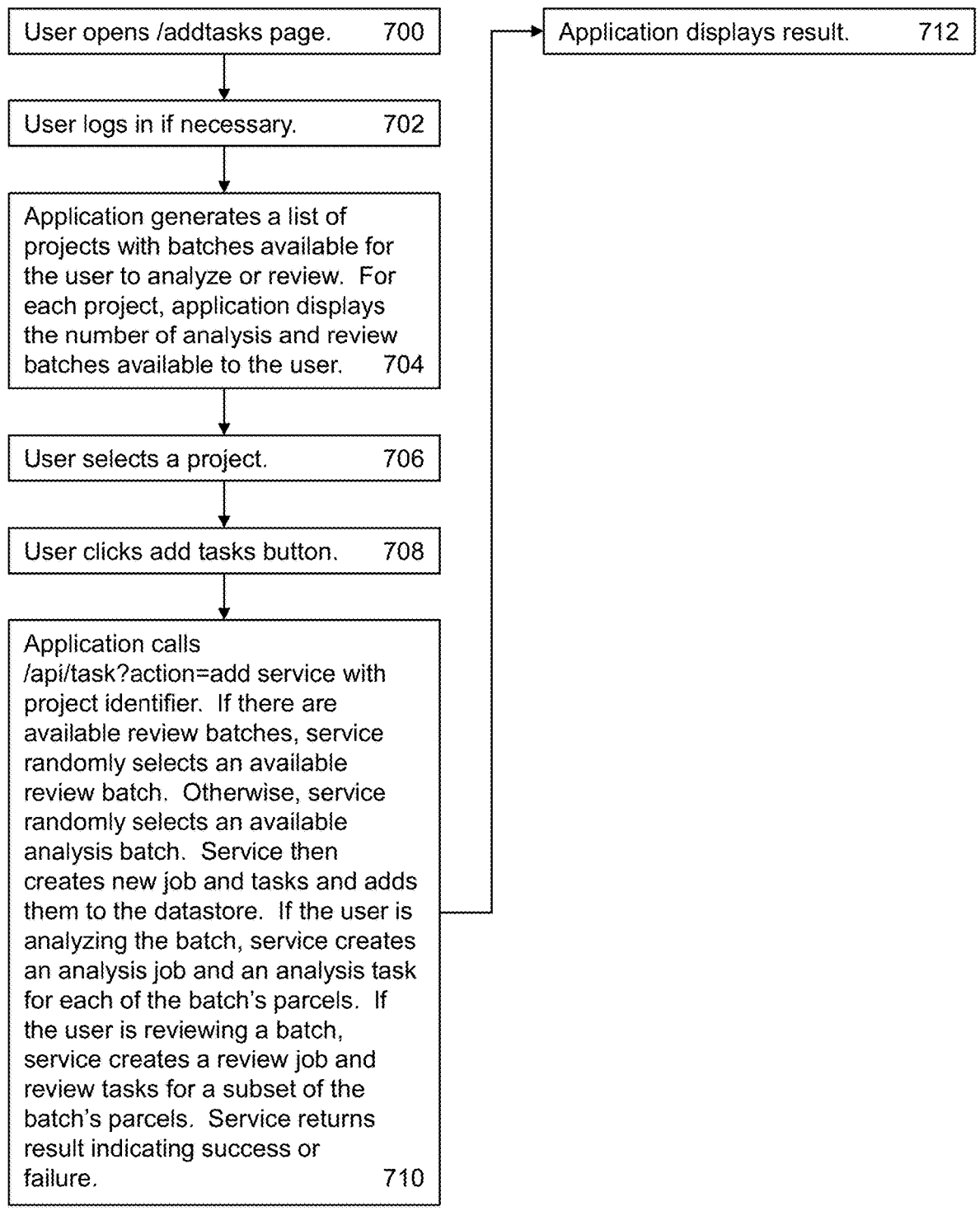
FIG. 7 is a flowchart for adding tasks in an embodiment of the present disclosure.

FIG. 7 is a flowchart for a method of adding tasks in an embodiment of the present disclosure. A task may be associated with a single parcel and contain classification information (e.g., is the parcel changed or unchanged) as well as review results (e.g., a comment if the reviewer disagreed with the classification). A user (e.g., an analyst or reviewer) may begin at step 700 by opening the /addtasks page 302. At step 702, the user may login if necessary. At step 704, the application may generate a list of projects with batches available for the user to analyze or review. An analysis batch maybe be a batch where an analyst or the system, or a combination thereof, is classifying all the parcels within a batch. A review batch is a batch where a reviewer is inspecting a subset of parcel classifications within a batch. For each project, the application may display the number of analysis and review batches available to the user. At step 706, the user may select a project. At step 708, the user may click an add tasks button. At step 710, the application may call the /api/task?action=add service 408 with the project identifier corresponding to the selected project. If there are available review batches, the service may randomly select an available review batch. Otherwise, the service may randomly select an available analysis batch. The service may then create new job and tasks and add them to the datastore 108. If the user is analyzing the batch, the service may create an analysis job and an analysis task for each of the batch's parcels. If the user is reviewing a batch, the service may create a review job and review tasks for a subset of the batch's parcels. A job may be a collection of tasks associated with a batch. An analysis job may contain a task to classify each parcel in a batch. A review job may contain a task to review a subset of parcels in a batch. The service may then return a result indicating success or failure (e.g., if an error occurred while adding tasks). At step 712, the application may display the result.

Figure 8:
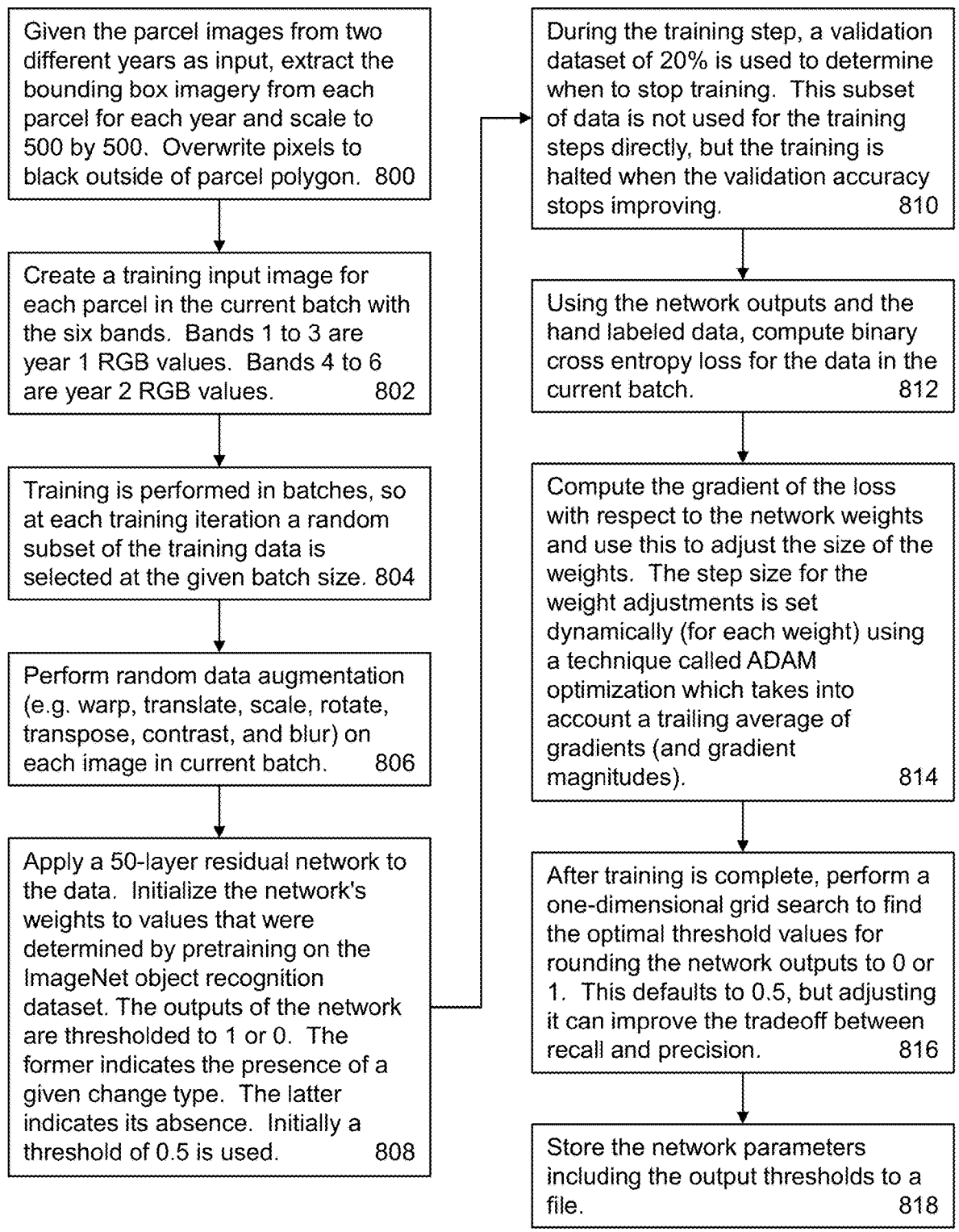
FIG. 8 is a flowchart for training a classifier to automatically recognize parcel changes in an embodiment of the present disclosure.

FIG. 8 is a flowchart for a method of training an automatic parcel classifier in an embodiment of the present disclosure. At step 800, a user may provide parcel images from two different periods of time, such as but not limited to, two different years or other suitable time period, as input. The application may then extract the bounding box or polygon imagery for each parcel. The application may then scale each image (e.g., but not limited to, 500 by 500 pixels). The application may then overwrite pixels outside of the parcel polygon to black or some other color or may use any other method of blocking out or ignoring pixels outside the parcel polygon. At step 802, the application may create a training input image for each parcel in the current batch with six bands. Bands 1 to 3 may be RGB values, respectively, from year 1. Bands 4 to 6 may be RGB values, respectively, from year 2. However, other color models and corresponding number of bands may be used. At step 804, the application may begin performing training in batches with each training iteration containing a random subset of the training data selected at a given batch size (e.g., but not limited to, 48 samples per batch). At step 806, the application may perform data augmentation on each image in the current training batch (e.g., but not limited to, one or more of add random warping, add random translation, add random scaling, add random rotation, randomly transpose, randomize the contrast, and randomly blur the images). At step 808, the application may apply a, for example, 50-layer residual network to the data. The application may initialize the network's weights to values that were determined by pre-training on the ImageNet object recognition dataset (see http://www.image-net.org). One skilled in the at will recognize that one could use other datasets for pretraining or skip the pretraining step. The application may output values thresholded, for example, to 1 or 0. The former indicates the presence of a given change type (e.g., an addition or pool). The latter indicates the absence of a given change type. Initially the application may use a threshold of 0.5. Of course, other threshold values may be used. At step 810, during the training step, the application may use a validation dataset of 20% to determine when to stop training. One skilled in the art will recognize that one could use other validation dataset sizes (e.g., but not limited to, 5% or 30%). The application may exclude this subset of data from the training steps, but halt training when the validation accuracy stops improving by more than a predetermined amount, which could be as low as by 0%. At step 812, the application may use the network outputs and the hand-labeled data (e.g., parcels manually labelled by analysts as changed or unchanged and indicating change types) to compute binary cross entropy loss for the data in the current training batch. At step 814, the application may compute the gradient of the loss with respect to the network weights and use this to adjust the size of the weights. The step size for the weight adjustments may be set dynamically (for each weight) using, for example, but not limited to, a technique called ADAM optimization which considers a trailing average of gradients (and gradient magnitudes). At step 816, after training is complete, the application may perform a one-dimensional grid search to find the optimal threshold values for rounding the network outputs to 0 or 1. As noted above, these may default to 0.5, but adjusting it may improve the tradeoff between recall and precision. At step 818, the application may store the network parameters including the output thresholds to a file.

One skilled in the art will recognize that one could implement this automatic parcel classifier using a variety of platforms including TensorFlow, Theano, or Torch. Also, there are many ways to combine the old and new image data. For example, one might interleave pixel data or put one image before the other in a data array. Also, one might use fewer or more bands from the images. For example, one might include near infrared (NIR) or other bands. Also, instead of a 50-layer residual network, one might use fewer or more layers or a different network such as AlexNet or VGGNet. Also, one might integrate additional information into the image data. For example, one might add information indicating whether a given pixel is within an existing building outline or has been classified as impervious. Also, one might pretrain the network with ImageNet data or a variety of other pretrained networks. Alternatively, one might not pretrain the network. Also, one might use a variety of data augmentation techniques such as those listed above or others. In addition, one might apply a variety of thresholding techniques to the network's output values. Also, instead of scaling images to fixed dimensions (e.g., 500 by 500 pixels), one might use a variety of other techniques for obtaining input images with a regular size. For example, one might tile the parcel imagery and classify each tile. Another option would be to use a window with a fixed size (e.g., 200 by 200 feet), center each parcel image on this window, use this window to crop the parcel imagery, and then black out any pixels that fall outside of the parcel boundary.

Figure 9:
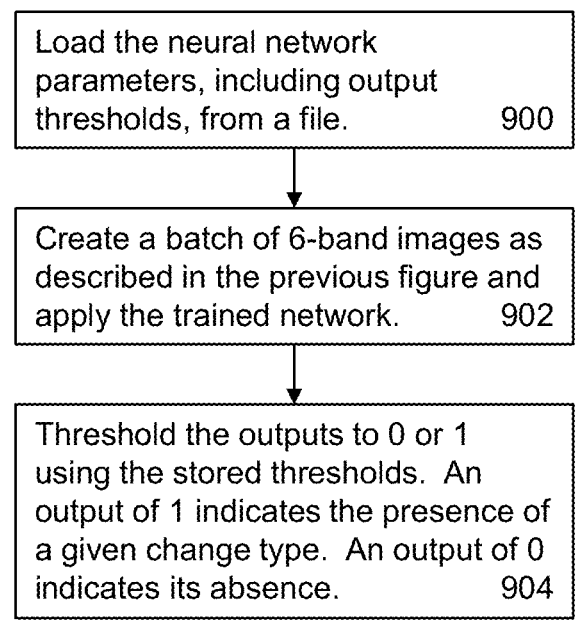
FIG. 9 is a flowchart for using a trained classifier to automatically recognize parcel changes in an embodiment of the present disclosure.

Expanding on step 206 of the general overview in FIG. 2, FIG. 9 is a flowchart for a method of automatically classifying a parcel in an embodiment of the present disclosure. At step 900, the application may load neural network parameters, including output thresholds, from a file. This may be the file saved in step 818 in the previous figure. At step 902, the application may create a batch of 6-band images as described in step 802 of the previous figure. The application may then apply the trained network. At step 904, the application may threshold the outputs to 0 or 1 using the stored thresholds. For each change type, an output of 1 may indicate the presence of the given change type (e.g., an addition or pool); an output of 0 may indicate its absence.

Figure 10:
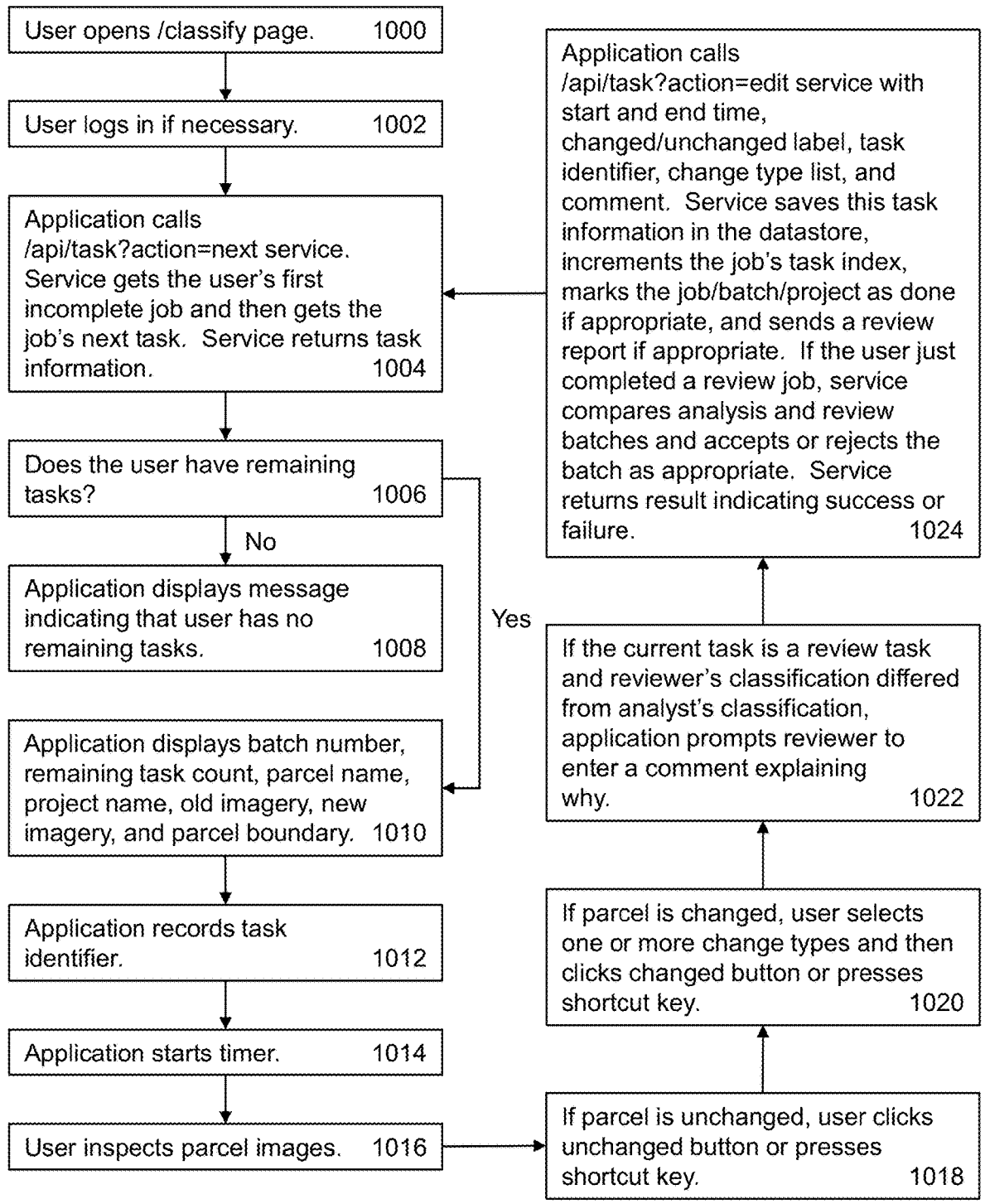
FIG. 10 is a flowchart for manually classifying parcels as changed or unchanged in an embodiment of the present disclosure.

FIG. 10 is a flowchart for a method of manually classifying a parcel in an embodiment of the present disclosure, which may be done as an alternative to, in addition to, or in combination with, the automatic classification described above with respect to FIG. 9. At step 1000, a user (e.g., an analyst or reviewer) may open the /classify page 304. At step 1002, the user may login if necessary. At step 1004, the application may call the /api/task?action=next service 416. The service may get the user's first incomplete job and then get the job's next task. The service may return this task information. At step 1006, the application may determine if the user has remaining tasks. If the user has no remaining tasks, the application may advance to step 1008 and may display a message indicating that user has no remaining tasks. If the user has remaining tasks the application may advance to step 1010. At step 1010, the application may display the batch number, remaining task count, parcel name, project name, old imagery, new imagery, and/or parcel boundary. At step 1012, the application may record the task identifier. At step 1014, the application may start a timer. At step 1016, the user may inspect the parcel images. At step 1018, if the parcel is unchanged, the user may click an "unchanged" button or the like or press a shortcut key(s) for achieving the same result. At step 1020, if the parcel is changed, the user may select one or more change types (e.g., but not limited to, addition or pool) and then click a "changed" button or the like or press a shortcut key(s) for achieving the same result. At step 1022, if the current task is a review task and the reviewer's classification differed from the system's automatic classification or an analyst's initial manual classification, the application may prompt the reviewer to enter a comment explaining the different classification. At step 1024, the application may call the /api/task?action=edit service 412 with some or all of a start and end time, changed/unchanged label, task identifier, change type list, and comment. The service may save this task information in the datastore 108, increment the job's task index, mark the job/batch/project as done if appropriate, and send a review report if appropriate (see FIG. 11). If the user just completed a review job, the service may compare analysis and review batches and accepts or rejects the batch as appropriate. The service may then return a result indicating success or failure (e.g., if an error occurred while saving the parcel's classification). The application may then return to step 1004 to get the next task.

Figure 11:
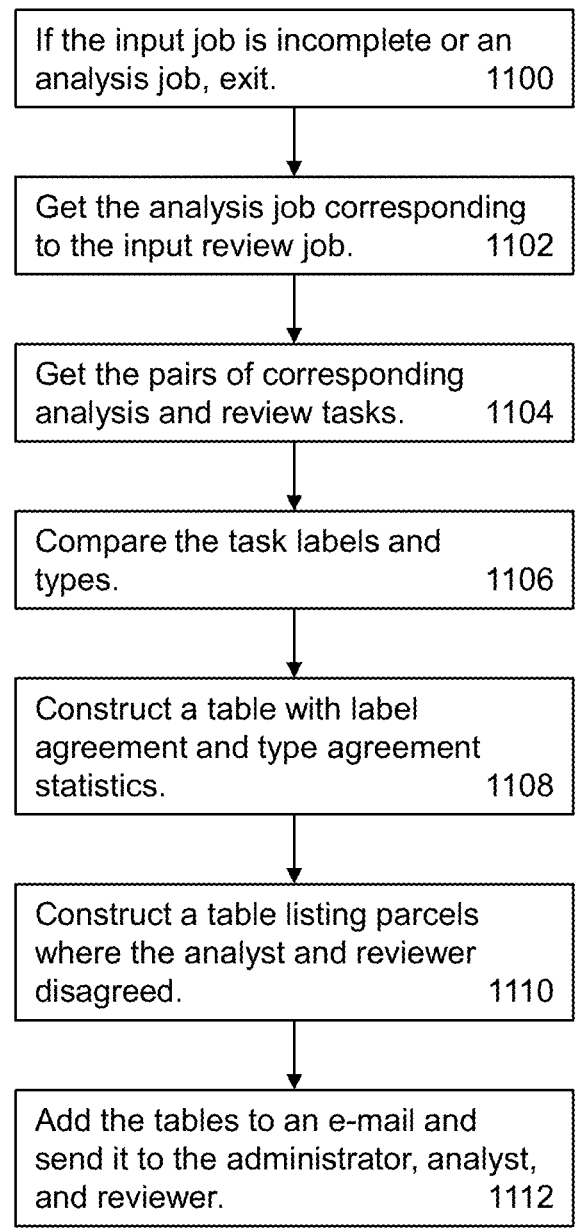
FIG. 11 is a flowchart for sending the result of a review to an analyst in an embodiment of the present disclosure.

Expanding on step 212 of the general overview in FIG. 2, FIG. 11 is a flowchart for a method of sending a review e-mail or other communication when a reviewer finishes reviewing a job in an embodiment of the present disclosure. The system may send this review e-mail to any or all of the analyst who performed the classifications, the reviewer who reviewed the classifications, and any system administrators. At step 1100, if the input job is incomplete or an analysis job, the application may exit. At step 1102, the application may get the analysis job corresponding to the input review job. At step 1104, the application may get the pairs of corresponding analysis and review tasks. At step 1106, the application may compare the task labels and types. At step 1108, the application may construct a table with label agreement and type agreement statistics. At step 1110, the application may construct a table listing parcels where the system/analyst and reviewer disagreed. The application may link each parcel to the /parcel?action=compare page 308 to facilitate reviewing disagreements. At step 1112, the application may add the tables to an e-mail and send it to one or more of the administrator, analyst, and reviewer.

Figure 12:
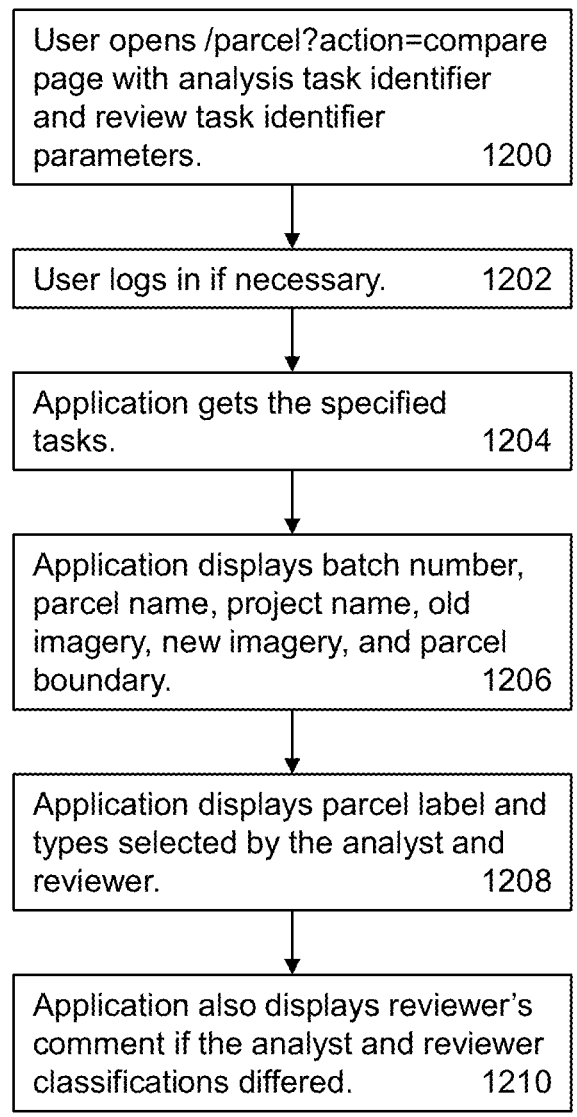
FIG. 12 is a flowchart for comparing parcels classifications made by an analyst and a reviewer in an embodiment of the present disclosure.

FIG. 12 is a flowchart for a method of comparing system/analyst and reviewer classifications in an embodiment of the present disclosure. At step 1200, a user may begin by opening a /parcel?action=compare page 308 with analysis and review task identifiers. The user need not be but is typically different than the reviewing user (i.e., the user that reviewed the system's or analyst's initial classification). At step 1202, the user may login if necessary. At step 1204, the application may get the specified tasks from the datastore 108. At step 1206, the application may display one or more of the batch number, parcel name, project name, old imagery, new imagery, and parcel boundary. At step 1208, the application may display the parcel label and types selected by the system/analyst and reviewer. At step 1210, the application may display the reviewer's comment if the system/analyst and reviewer classifications differed.

Figure 13:
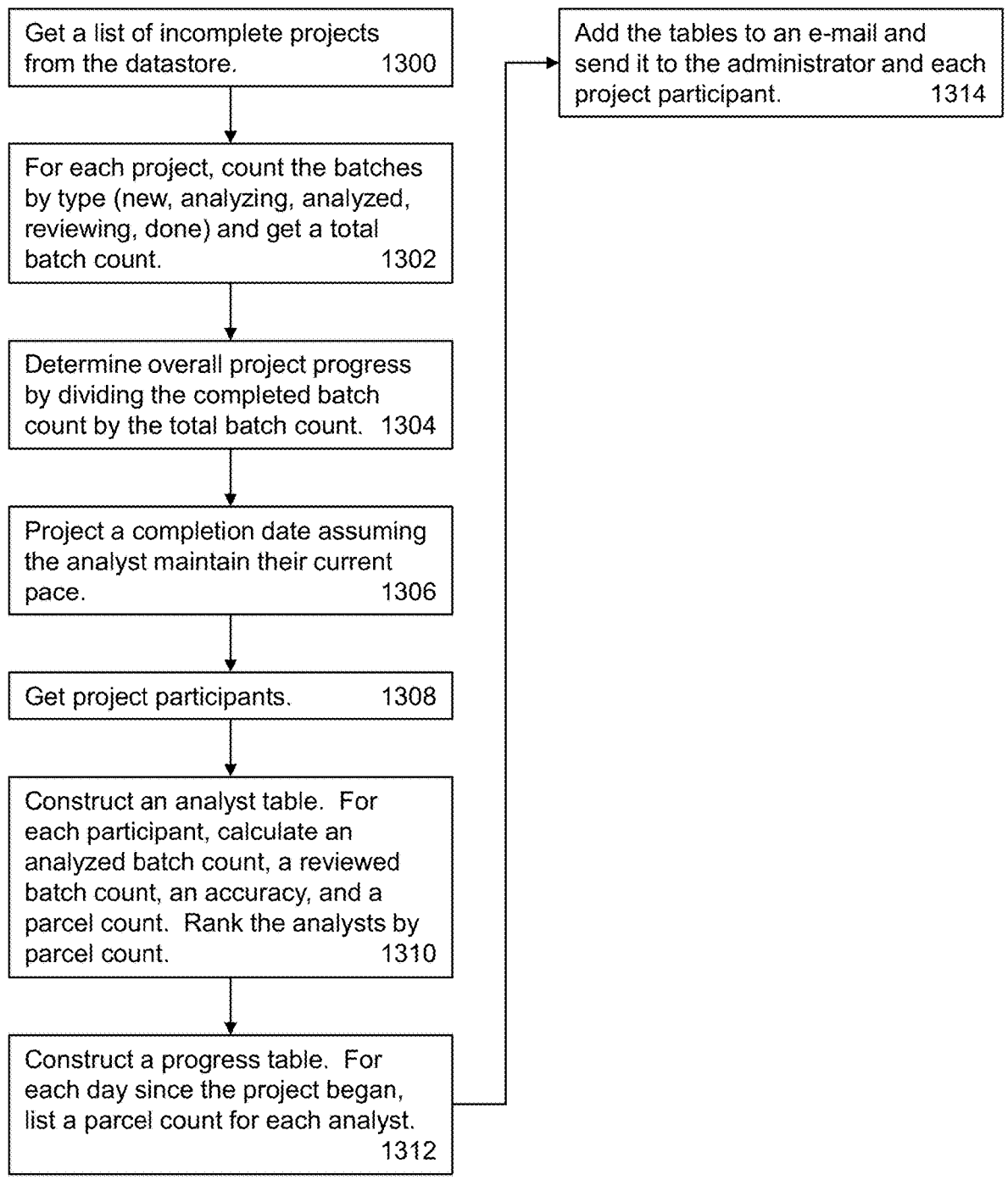
FIG. 13 is a flowchart for sending a daily project update to analysts and administrators in an embodiment of the present disclosure.

FIG. 13 is a flowchart for a method of sending a daily project update in an embodiment of the present disclosure. At step 1300, the application may get a list of incomplete projects from the datastore 108. At step 1302, for each project, the application may count the batches by type (e.g., new, analyzing, analyzed, reviewing, or completed) and/or get a total batch count. At step 1304, the application may determine an overall project progress by dividing the completed batch count by the total batch count. At step 1306, the application may project a completion date assuming the system, analyst(s), and/or reviewer(s) maintain a current pace. At step 1308, the application may get project participants (e.g., analysts and reviewers who have worked on the project as well as system administrators). At step 1310, the application may construct an analyst table. For each participant, the application may calculate and display one or more of an analyzed batch count, a reviewed batch count, an accuracy, and a parcel count. The application may rank the analysts by parcel count. At step 1310, the application may also construct a progress table. For each day since the project began, the progress table may list a parcel count for each analyst. At step 1312, the application may add the tables to an e-mail or other suitable communication and send it to the administrator and/or each project participant.

Figure 14:
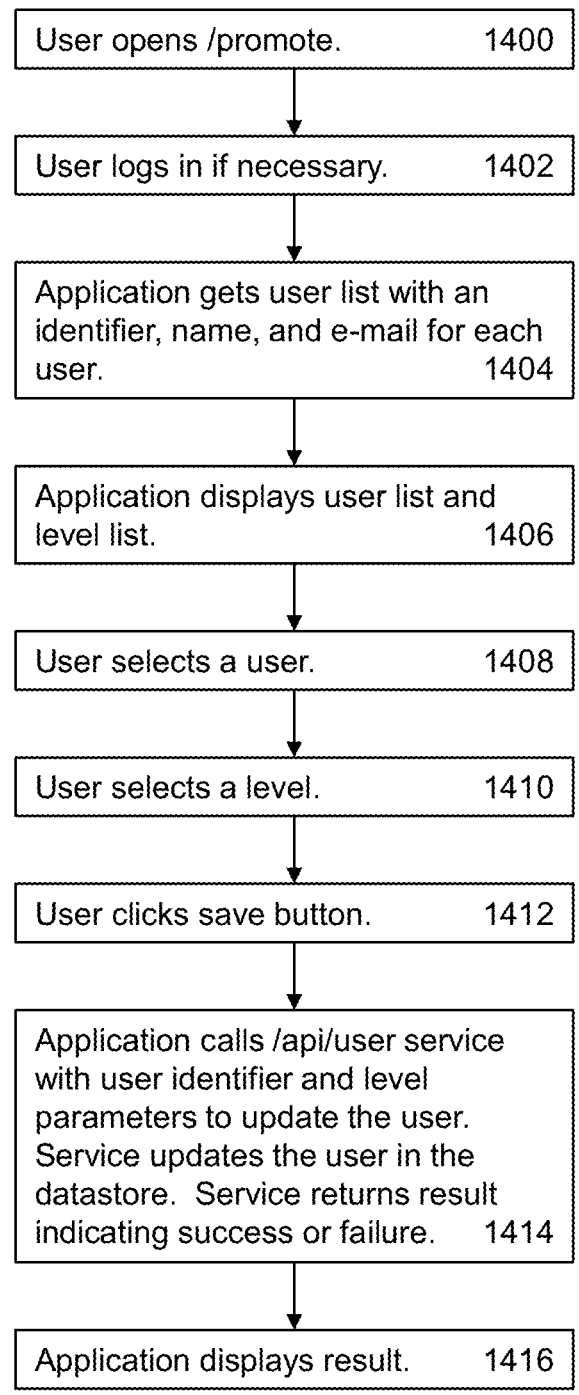
FIG. 14 is a flowchart for promoting a user in an embodiment of the present disclosure.

FIG. 14 is a flowchart for a method of promoting a user in an embodiment of the present disclosure. At step 1400, a user may begin by opening a /promote page 312. At step 1402, the user may login if necessary. At step 1404, the application may get a user list with at least one of an identifier, name, and e-mail for each user. At step 1406, the application may display the user list and level list (e.g. trainee, analyst, reviewer, and administrator). At step 1408, the user may select a user from the user list. At step 1410, the user may select a level from the level list. At step 1412, the user may click a "save" button or the like. At step 1414, the application may call the /api/user service 418 with the user identifier and level parameters to update the user. The service may update the user in the datastore 108. The service may return a result indicating success or failure. At step 1416, the application may display the result.

Figure 15:
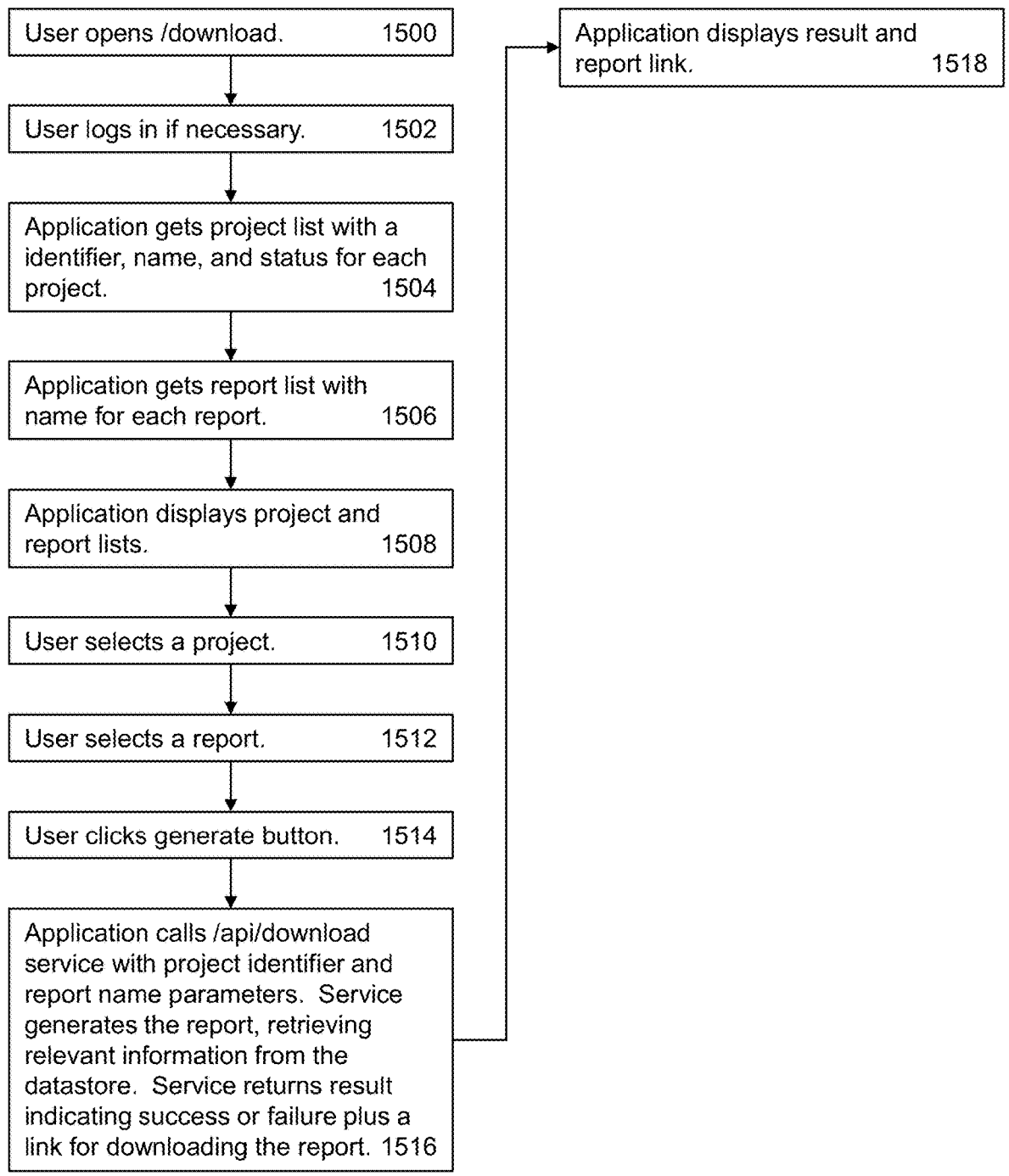
FIG. 15 is a flowchart for downloading project information and results in an embodiment of the present disclosure.

Expanding on step 218 in the general overview in FIG. 2, FIG. 15 is a flowchart for a method of downloading a report in an embodiment of the present disclosure. At step 1500, a user (e.g., an administrator) may begin by opening a /download page 306. At step 1502, the user may login if necessary. At step 1504, the application may get a project list with at least one of an identifier, name, and status for each project. At step 1506, the application may get a report list with name or other identifier for each report. At step 1508, the application may display the project and report lists. At step 1510, the user may select a project. At step 1512, the user may select a report. At step 1514, the user may click a "generate" button or the like. At step 1516, the application may call a /api/download service 400 with project identifier and report name parameters. The service may generate the report, retrieving relevant information from the datastore 108. The service may return a result indicating success or failure plus a link for downloading the report. At step 1518, the application may display the result and report link.

Figure 16:
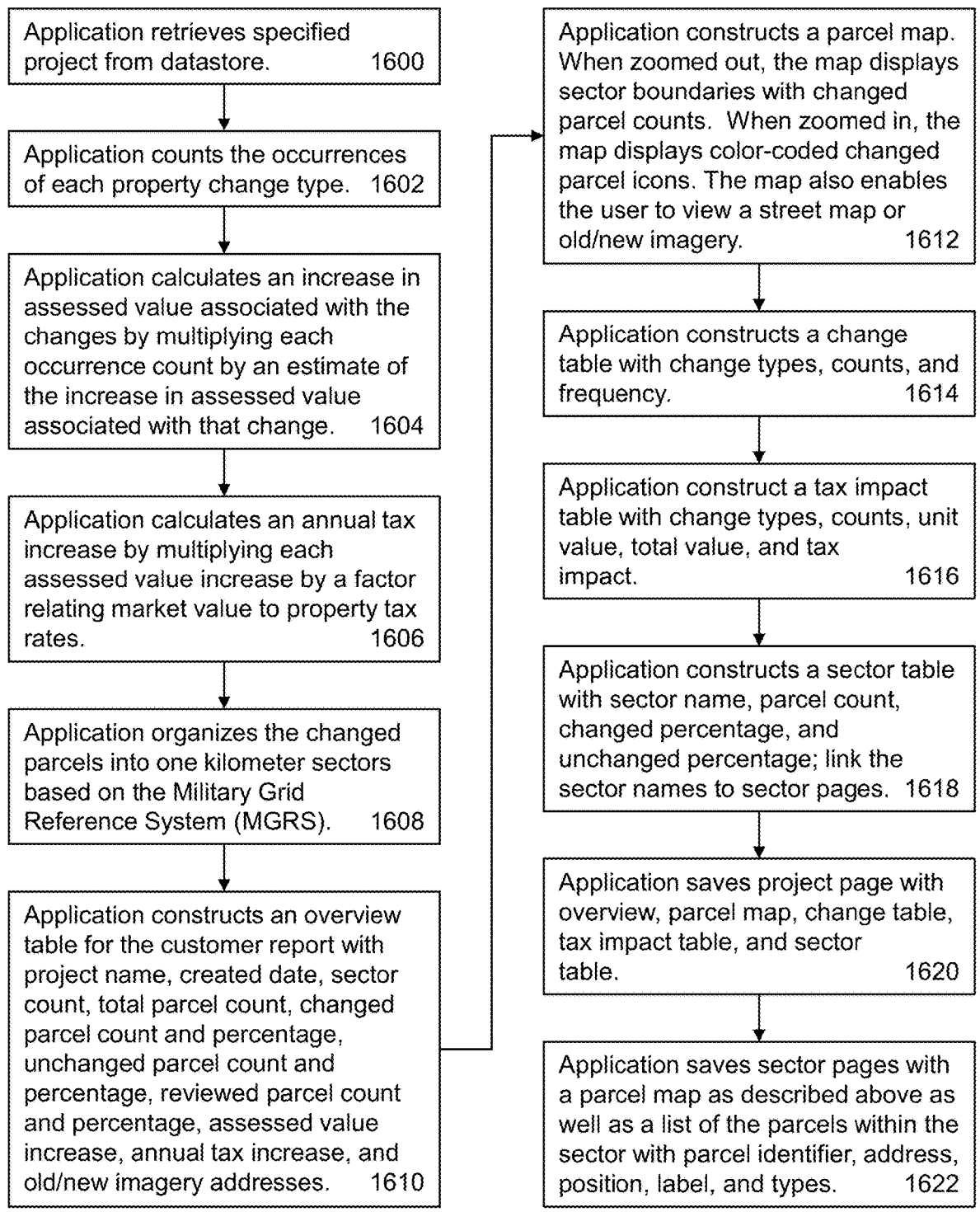
FIG. 16 is a flowchart for generating a customer report in an embodiment of the present disclosure.

FIG. 16 is a flowchart for a method of generating a customer report in an embodiment of the present disclosure. At step 1600, the application may begin by retrieving a specified project from the datastore 108. At step 1602, the application may count the occurrences of each property change type. At step 1604, the application may calculate an estimated or actual increase in assessed value associated with the changes by multiplying each occurrence count by an estimate of the increase in assessed value associated with that change type (for example and for purposes of illustration only, using non-limiting value estimates, $38K for an addition, $6K for construction, $8K for a deck, $4K for flatwork, $32K for a garage, $180K for a new home, $12K for a pool, and $2K for a shed). At step 1606, the application may calculate an estimated or actual annual tax increase by multiplying each assessed value increase by a factor relating market value to property tax rates (e.g., the local property tax rates). At step 1608, the application may organize the parcels into one-kilometer sectors based on the Military Grid Reference System (MGRS). However, other sector sizes and reference systems may be used. At step 1610, the application may construct an overview table for the customer report with one or more of project name, created date, sector count, total parcel count, changed parcel count and percentage, unchanged parcel count and percentage, reviewed parcel count and percentage, estimated or actual assessed value increase, estimated or actual annual tax increase, old imagery address, and new imagery address. At step 1612, the application may construct a parcel map. When the user zooms out, the map may display sector boundaries and a changed parcel count for each sector. The map may color the sector marker to indicate changed parcel density (e.g., but not limited to, red for high density, orange for medium density, and yellow for low density). When the user zooms in, the map may display individual changed parcel markers color-coded to indicate the change type (e.g., addition or pool). The map may also enable the user to view a street map, the old imagery, or the new imagery. At step 1614, the application may construct a change table with one or more of change types, counts, and frequency. At step 1616, the application may construct a tax impact table with one or more of change types, counts, unit value, total value, and tax impact. At step 1618, the application may construct a sector table with one or more of sector name, parcel count, changed percentage, and unchanged percentage. The application may link the sector names to sector pages. A sector page lists information about parcels within that sector. MGRS assigns a name to each sector (e.g., one square kilometer area). At step 1620, the application may save the project page with any overview, parcel map, change table, tax impact table, or sector table. At step 1622, the application may save the sector pages with a parcel map as described in step 1612 as well as a list of the parcels within the sector with one or more of parcel identifier, address, position, label, and types. The application may link each parcel to the /parcel?action=view page 310 to enable a user to view old and new imagery of a parcel and view the parcel's classification.

Figure 17:
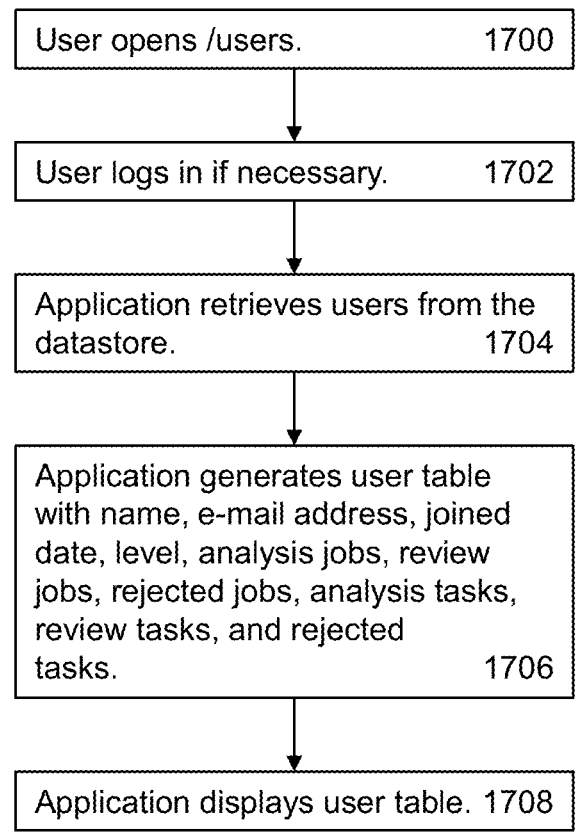
FIG. 17 is a flowchart for displaying information for all users in an embodiment of the present disclosure.

FIG. 17 is a flowchart for a method of viewing information about any or all users in an embodiment of the present disclosure. At step 1700, a user may begin by opening a /users page 314. At step 1702, the user may login if necessary. At step 1704, the application may retrieve user information from the datastore 108. At step 1706, the application may generate a user table with one or more of name, e-mail address, joined date, level, analysis jobs, review jobs, rejected jobs, analysis tasks, review tasks, and rejected tasks for all or a subset of users or an individual user. At step 1708, the application may display the user table.

Figure 18:
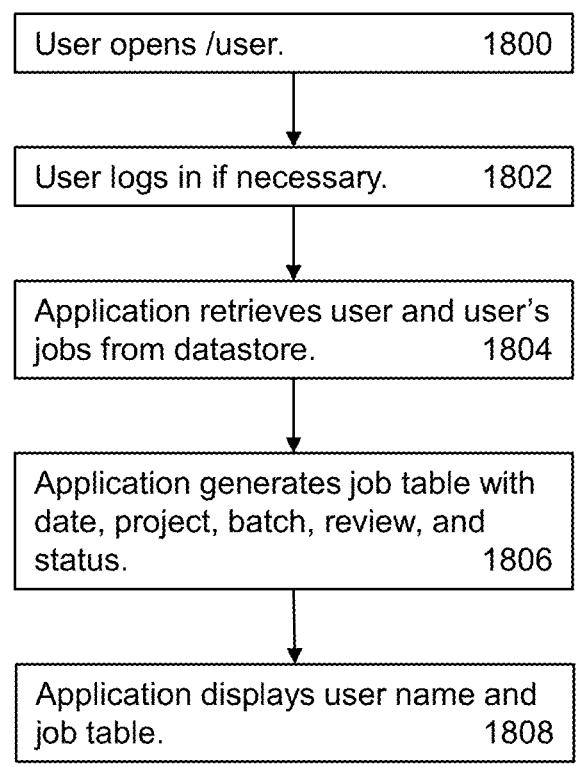
FIG. 18 is a flowchart for displaying information for one user in an embodiment of the present disclosure.

FIG. 18 is a flowchart for a method of viewing information about a user in an embodiment of the present disclosure. At step 1800, a user may begin by opening a /user page 316. At step 1802, the user may login if necessary. At step 1804, the application may retrieve information about the user and the user's jobs from the datastore 108. At step 1806, the application may generate a job table with one or more of created date, project, batch, review, and status. At step 1808, the application may display the user's name and the job table.

FIG. 19 is an example add project page for an embodiment of the present disclosure. An administrator (or other user with appropriate user credentials) might use this page to create a new project to analyze parcel changes in a specified region, for example Hennepin county. The page may include a title element 1900 identifying the page and a user element 1902 identifying the user, with a link for logging out, and a user level identification (e.g., administrator). The page may include a project name input 1904, a parcel attribute input 1906, an address attributes input 1908, an old imagery source or URL input 1910, an old imagery type input 1912, an old imagery layer input 1914, a new imagery source or URL input 1916, a new imagery type input 1918, a new imagery layer input 1920, and an "import parcels" button or the like 1922.

Figure 20:
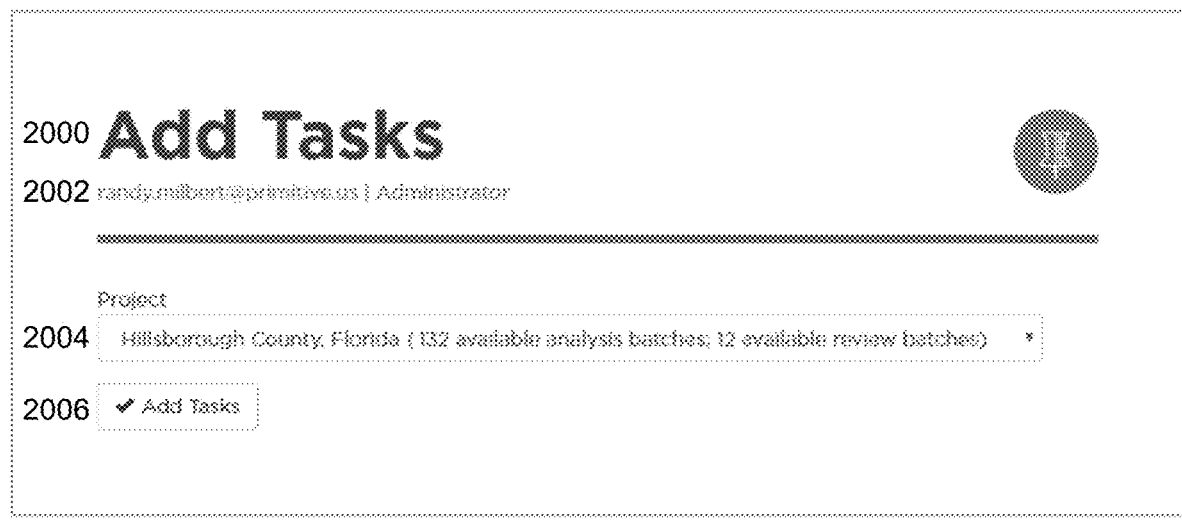
FIG. 20 is a screenshot of a page for adding tasks in an embodiment of the present disclosure.

FIG. 20 is an add tasks page in an embodiment of the present disclosure. An analyst might use this page to select a batch of parcels to analyze or review. The page may include a title element 2000 and a user element 2002 with a link for logging out and a user level. The page may include a project input 2004 and an add tasks button 2006.

Figure 21:
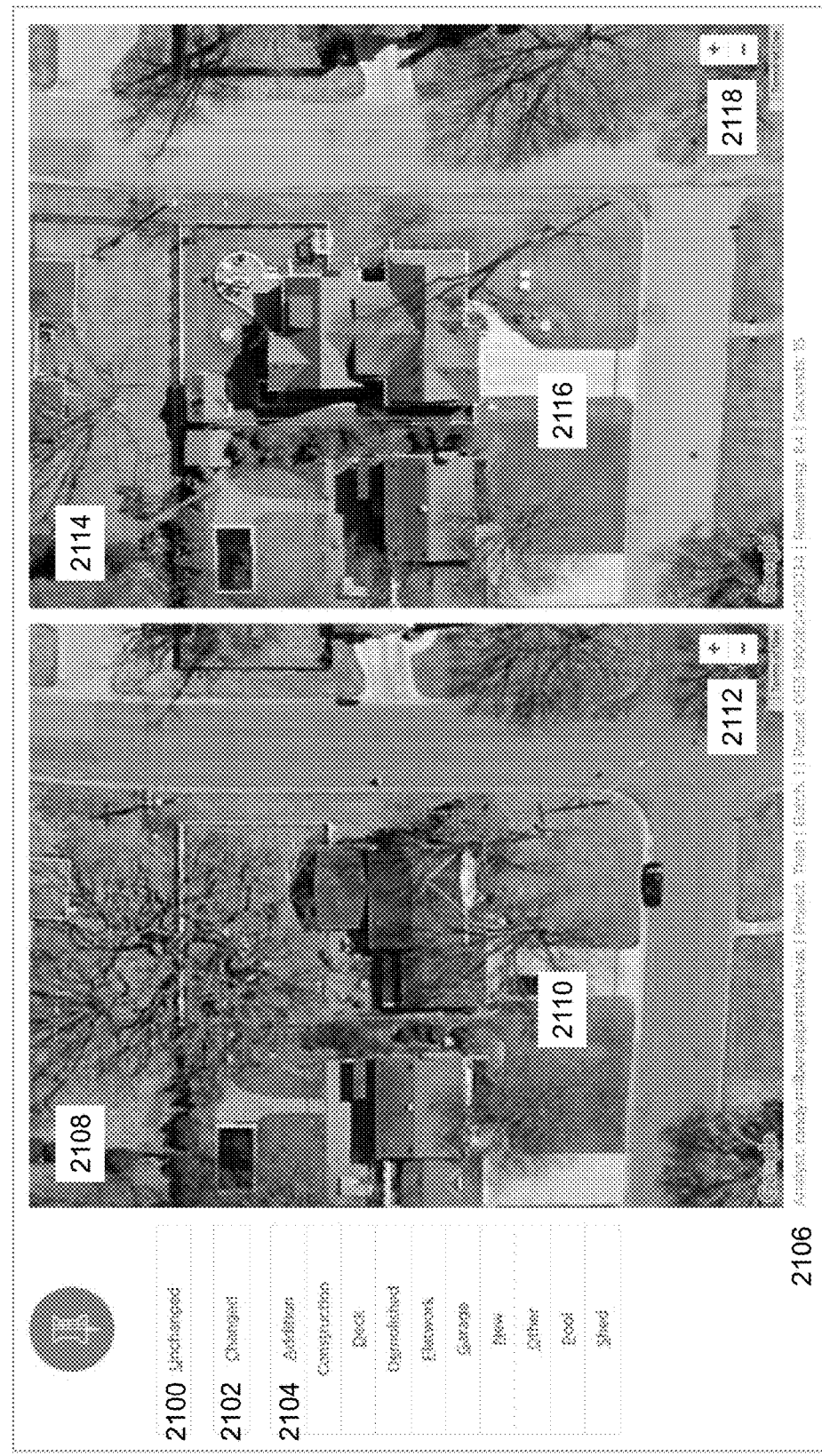
FIG. 21 is a screenshot of a page for classifying a parcel as changed or unchanged in an embodiment of the present disclosure.

FIG. 21 is a classify page in an embodiment of the disclosure. An analyst might use this page to classify a parcel as changed or unchanged and select one or more change type. The page may include an unchanged button 2100, a changed button 2102, and change type buttons 2104 (e.g., addition, construction, deck, demolished, flatwork, garage, new, other, pool, and/or shed). The page may also include task information 2106 (e.g., analyst e-mail address with link to logout, project name, batch number, parcel identifier, remaining task count, and/or seconds since starting the current task). The page may include an old map 2108 with a parcel boundary 2110 and zoom buttons 2112. The page may include a new map 2114 with a parcel boundary 2116 and zoom buttons 2118. The maps may also support panning by clicking and dragging with the mouse or through other means.

Figure 22:
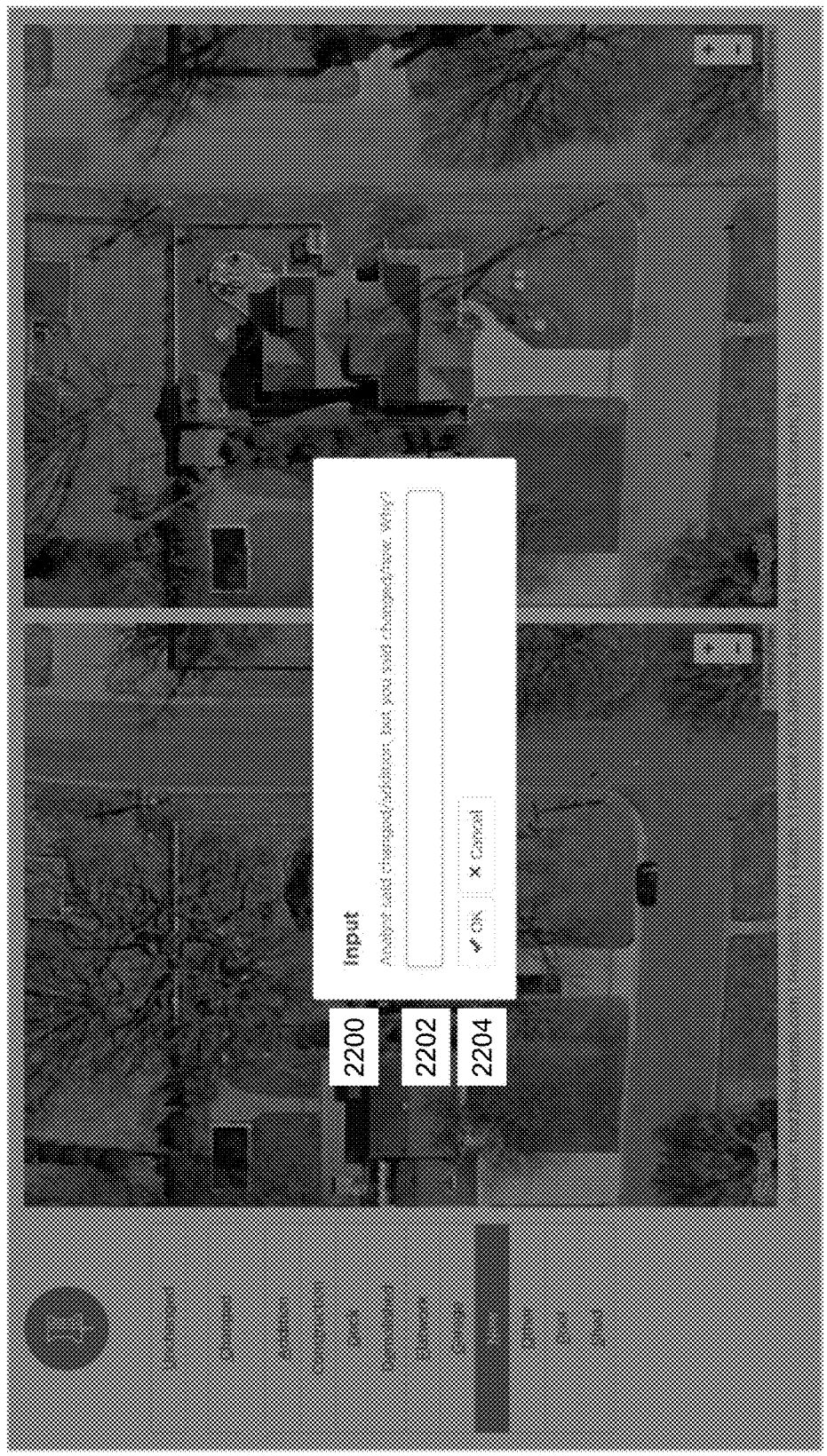
FIG. 22 is a screenshot of a dialog for entering a comment during a review in an embodiment of the present disclosure.

FIG. 22 is a reviewer comment dialog box in an embodiment of the disclosure. The application might present this dialog box if a reviewer classifies a parcel differently than the system or an analyst. In that case, the dialog may give the reviewer an opportunity to explain his or her classification. This may help users learn and improve over time. The dialog box may include a title 2200, a comment input 2212, and OK and cancel buttons 2214.

FIG. 23 is a review message in an embodiment of the disclosure. The application might send a review message like this via e-mail or some other communication means when a reviewer finishes reviewing a batch. This message provides feedback such as reviewer comments that may help an analyst learn and improve over time. The message may include a title 2300, an overview 2302, and a disagreements table 2304. The overview 2302 may include one or more of a project name, batch number, analyst name, reviewer name, total parcel count, changed parcel count and percentage, unchanged parcel count and percentage, reviewed parcel count and percentage, label agreement count and percentage, and types agreement count and percentage. The disagreements table 2304 may include one or more of a parcel column 2306, an analyst label column 2308, an analyst types column 2310, a reviewer label column 2312, a reviewer types column 2314, and a reviewer comment column 2316. The application may link each parcel to the /parcel?action=compare page 308 to facilitate reviewing disagreements.

Figure 24:
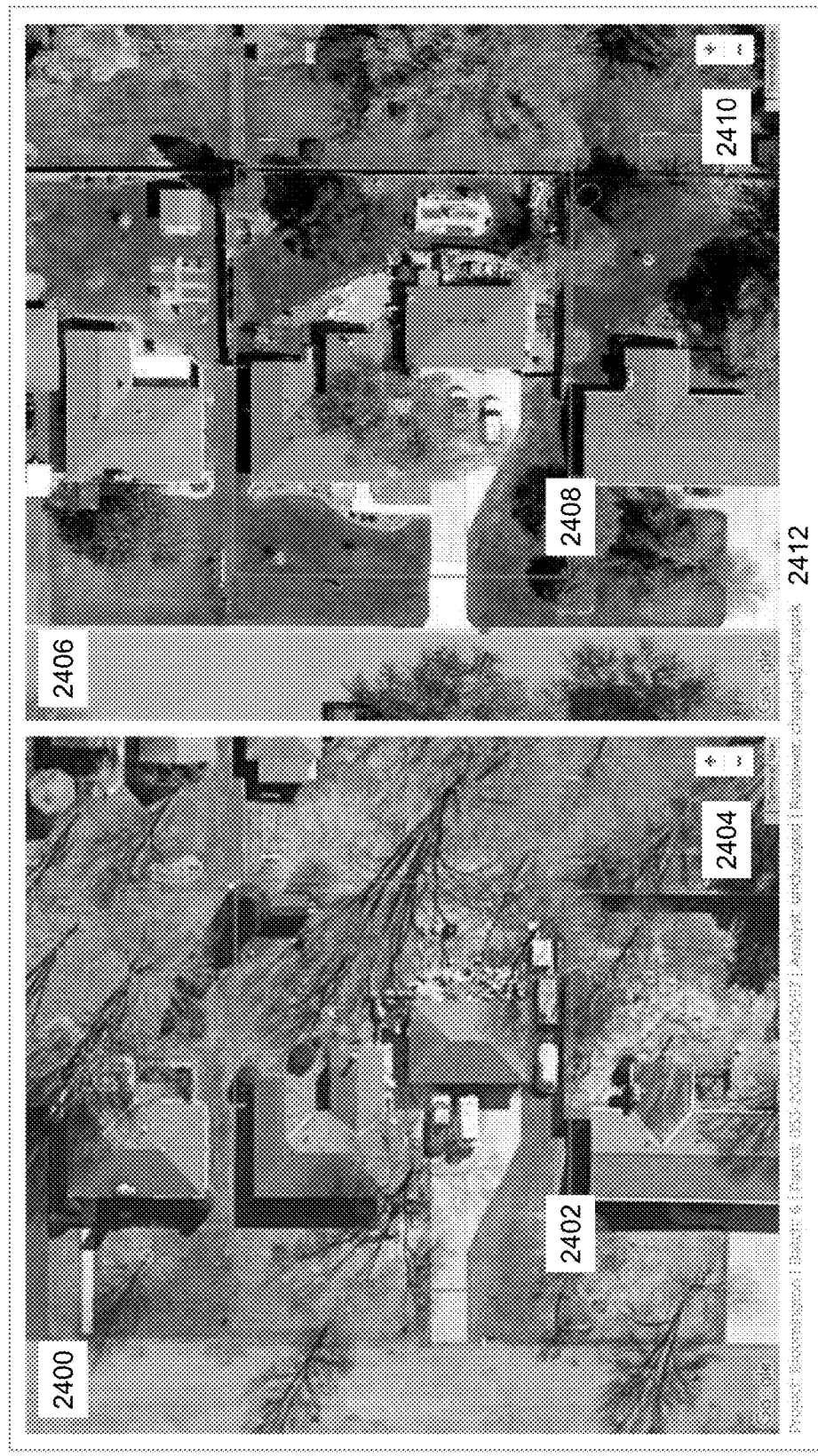
FIG. 24 is a screenshot of a page for comparing analyst and reviewer classifications in an embodiment of the present disclosure.

FIG. 24 is a compare page in an embodiment of the disclosure. The review message (see FIG. 24) might link each parcel disagreement to the compare page to facilitate analyst learning and improvement. The page may include an old map 2400 with a parcel boundary 2402 and zoom buttons 2404. The page may include a new map 2406 with a parcel boundary 2408 and zoom buttons 2410. The maps may also support panning by clicking and dragging with the mouse or through other means. The page may also include task information 2412 (e.g., project name, batch number, parcel identifier, analyst classification, reviewer classification, and/or reviewer comment).

FIG. 25 is a project update message in an embodiment of the present disclosure. The application might send a daily update message like this via e-mail or some other means. The message may indicate overall project progress as well as contributions from individual analysts. The message may include a title 2500, an overview table 2502, an analyst table 2504, and a progress table 2506. The overview table 2502 may include one or more of a project creation date, a batch count, a progress percentage, and a projected completion date. The analyst table 2504 may provide one or more of an analysis batch count, review batch count, accuracy measurement, and parcel count for each analyst. The progress table 2506 may provide a parcel count for each analyst on each day of the project.

Figure 26:
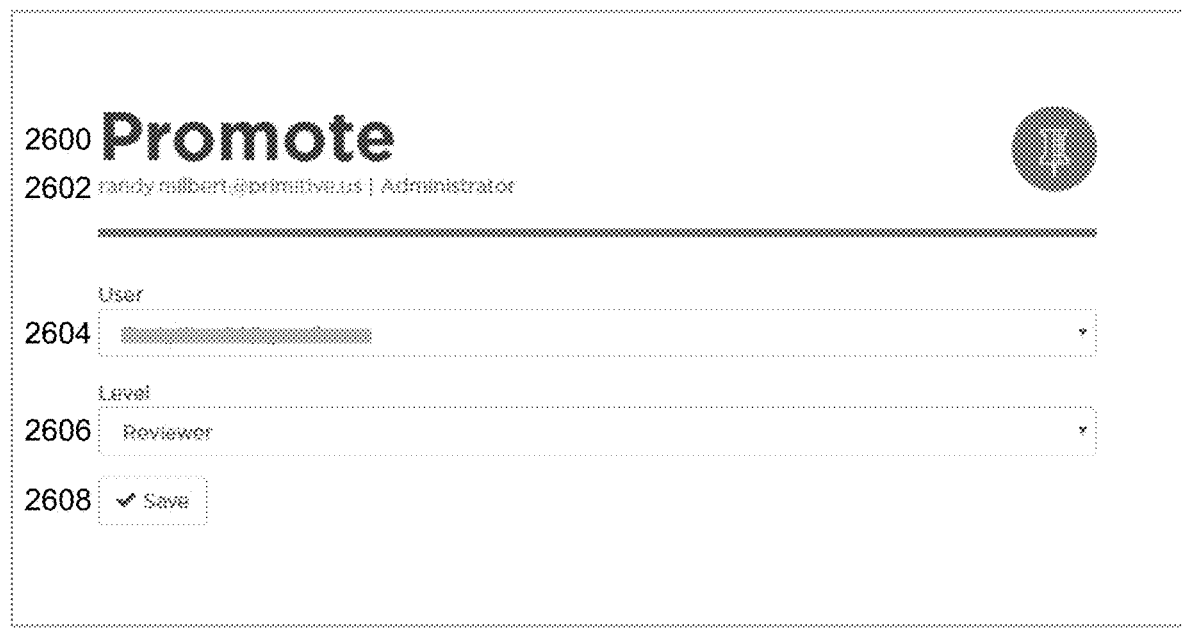
FIG. 26 is a screenshot of a page for promoting a user in an embodiment of the present disclosure.

FIG. 26 is a promote page in an embodiment of the present disclosure. An administrator (or other user with appropriate user credentials) might use the promote page to set a user's level (e.g., trainee, analyst, reviewer, or administrator). The page may include a title element 2600 and a user element 2602 with a link for logging out and a user level. The page may include a user input 2604, level input 2606, and a "save" button 2608.

FIG. 27 is a download report page in an embodiment of the present disclosure. A user or administrator might use this page to download a report once a project is complete. The page may include a title element 2700 and a user element 2702 with a link for logging out and a user level. The page may include a project input 2704, a report input 2706, and a "generate" button 2708.

FIG. 28 is a sample batch report in an embodiment of the present disclosure. A user or administrator might download a batch report to see how many batches are complete and who is working on what. The report may include one or more of an analyst column 2800, an analysis job identifier column 2802, an analysis job done column 2804, an analysis task index column 2806, an analysis task count column 2808, a batch identifier column 2810, a batch number column 2812, a batch done column 2814, a parcel count column 2816, a project identifier column 2818, a reviewer column 2820, a review job identifier column 2822, a review job done column 2824, a review task index column 2826, and a review task count column 2828.

Figure 29:
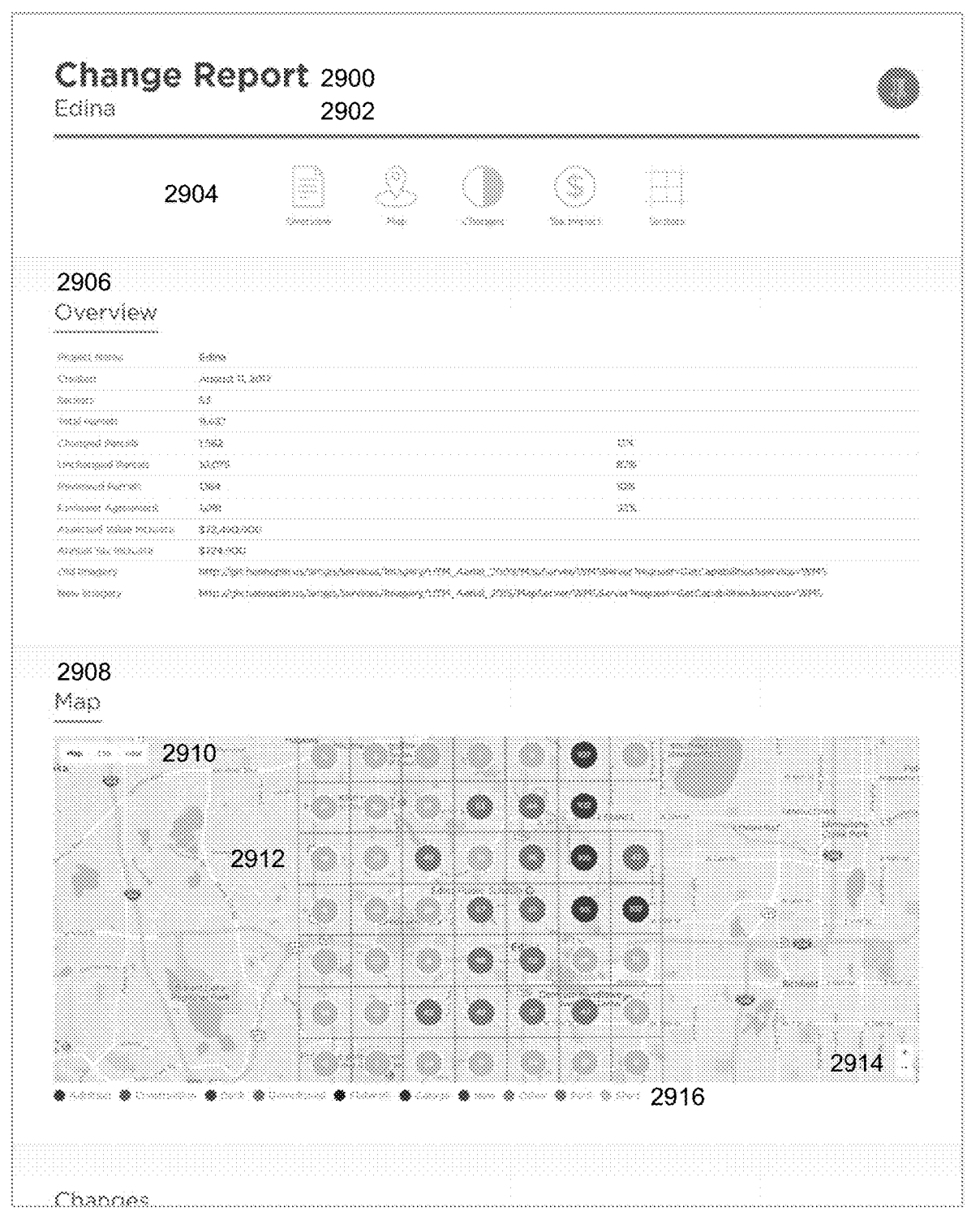

FIG. 29 is a first part of a sample customer report in an embodiment of the present disclosure. A user or administrator might download a customer report when a project is complete and may send it to the client. The report may include a title 2900 and a project name 2902. The report may include links 2904 to report sections (e.g., overview, map, changes, tax impact, and sectors) for easy navigation within the report. The report may include an overview 2906. The overview 2906 may include one or more of a project name, a created date, a sector count, a total parcel count, a changed parcel count and percentage, an unchanged parcel count and percentage, a reviewed parcel count and percentage, a reviewer agreement count and percentage, an estimated or actual assessed value increase, an estimated or actual annual tax increase, and old imagery URL, and a new imagery URL. The report may include a map 2908. The map 2908 may include map buttons 2910 for switching maps (e.g., street map, old imagery, and new imagery), sector outlines and markers 2912, zoom buttons 2914, and/or a key 2916. The map may also support panning by clicking and dragging or through other means.

Figure 30:
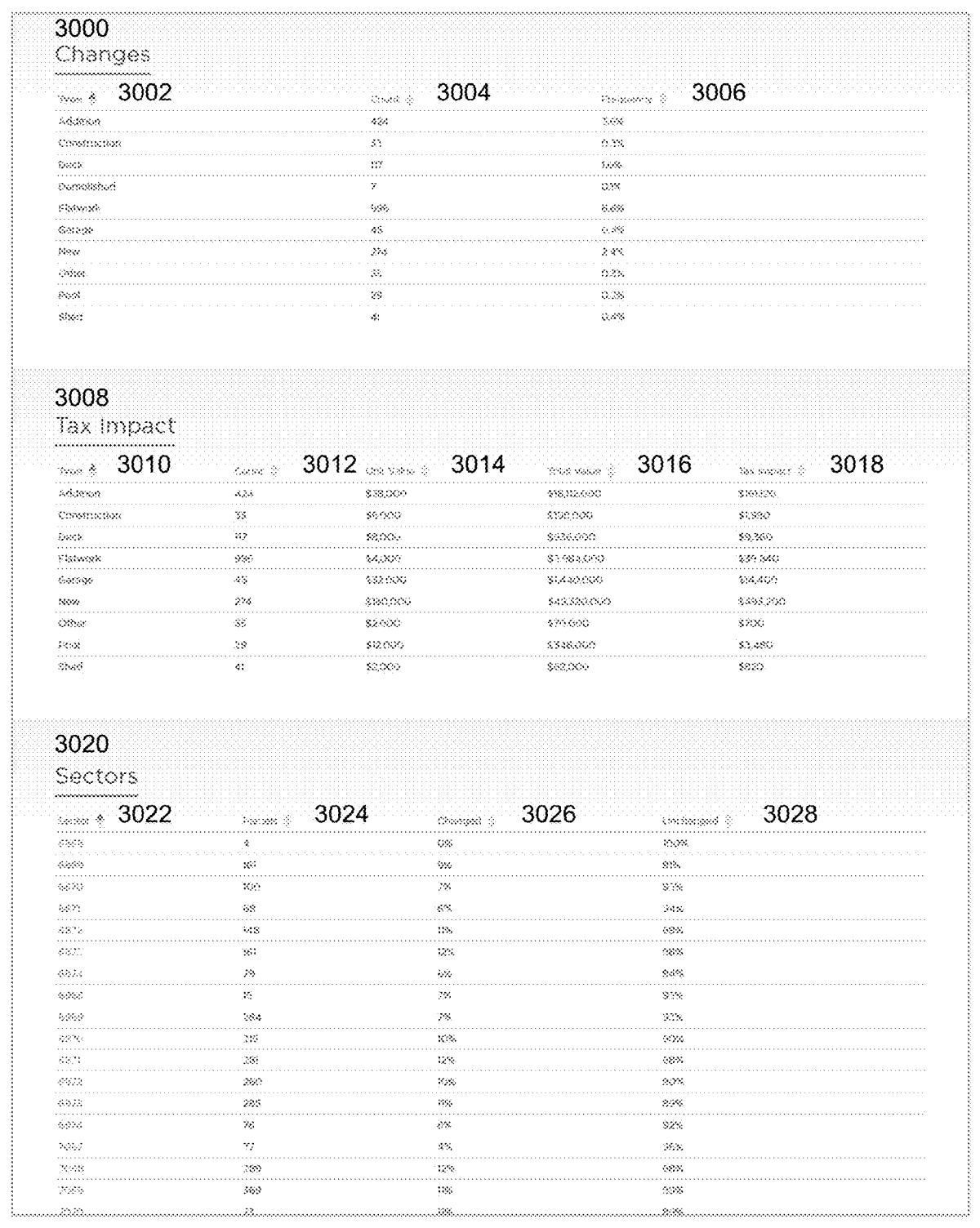

FIG. 30 is a second part of a sample customer report in an embodiment of the present disclosure. The report may include a changes table 3000. The changes table 3000 may include one or more of a change type column 3002, a count column 3004, and a frequency column 3006. The changes table 3000 may support sorting by any column. The report may include a tax impact table 3008. The tax impact table 3008 may include one or more of a change type column 3010, a count column 3012, a unit value column 3014, a total value column 3016, and a tax impact column 3018. The tax impact table 3008 may support sorting by any column. The report may include a sector table 3020. The sector table 3020 may include one or more of a sector column 3022, a parcel count column 3024, a changed percentage column 3026, and an unchanged percentage column 3028. The sector table 3020 may support sorting by any column. The application may link each sector to the corresponding sector report.

Figure 31:
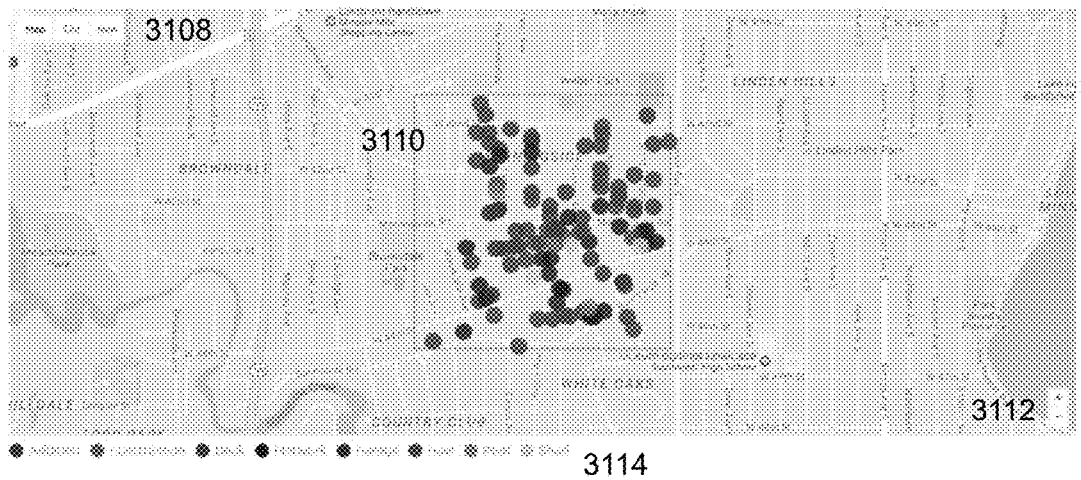
FIG. 31 is a third screenshot of a customer report in an embodiment of the present disclosure.

FIG. 31 is a third part of a sample customer report in an embodiment of the present disclosure. This is an example of a sector report. The sector report may include a title 3100 and a subtitle 3102 with project and sector names. The report may include links 3104 to report sections (e.g., map and parcels). The report may include a map 3106. The map 3106 may include map buttons 3108 for switching maps (e.g., street map, old imagery, and new imagery), a sector outline with changed parcel markers 3110, zoom buttons 3112, and/or a key 3114. The map may also support panning by clicking and dragging or through other means. The report may also include a parcel table 3116. The parcel table 3116 may include one or more of a parcel column 3118, an address column 3120, a position column 3122, a label column 3124, and a change types column 3126. The parcel table 3116 may support sorting by any column. The application may link each parcel in the parcel table 3116 to the /parcel?action=view page 310 to enable a user to view old and new imagery of a parcel and view the parcel's classification.

Figure 32:
FIG. 32 is a fourth screenshot of a customer report in an embodiment of the present disclosure.

FIG. 32 is a fourth part of a sample customer report in an embodiment of the present disclosure. This is an example of a /parcel?action=view page 310. The page may include an old map 3200 with a parcel boundary 3202 and optional zoom buttons 3204. The page may include a new map 3206 with a parcel boundary 3208 and optional zoom buttons 3210. The page may also include tax information 3212 (e.g., project name, batch number, parcel identifier, and/or classification). The maps may also support panning by clicking and dragging with the mouse or through other means.

FIG. 33 is a sample job report in an embodiment of the present disclosure. A user or administrator might download a job report to track progress on a project. The report may include one or more of a batch identifier column 3300, a done column 3302, a job identifier column 3304, a project identifier column 3306, a review column 3308, a task index column 3310, a task count column 3312, and a user identifier column 3314.

FIG. 34 is a sample parcel report in an embodiment of the present disclosure. An administrator might download a parcel report to review parcel details such as address, identifier, and points. The report may include an address column 3400, a batch identifier column 3402, a latitude column 3404, a longitude column 3406, a parcel identifier column 3408, a parcel name column 3410, a points column 3412, and a project identifier column 3414.

FIG. 35 is a sample quality report in an embodiment of the present disclosure. An administrator might download a quality report to review each batch's reviewer label and types agreement. The report may include a batch identifier column 3500, a batch number column 3502, a done column 3504, a parcel count column 3506, a project identifier column 3508, an analyst column 3510, a reviewer column 3512, a label agreement percentage column 3514, and a change types agreement percentage column 3516.

FIG. 36 is a sample result report in an embodiment of the present disclosure. An administrator might download a result report when a project is complete and send it to the client. The report may include a parcel identifier column 3600, an address column 3602, a latitude column 3604, a longitude column 3606, a sector column 3608, a label column 3610, and a change types column 3612.

FIG. 37 is a sample task report in an embodiment of the present disclosure. An administrator (or other user with appropriate user credentials) might download a task report to review task details such as the duration, label, and types. The report may include a batch identifier column 3700, an end time column 3702, a job identifier column 3704, a label column 3706, a parcel identifier column 3708, a parcel name column 3710, a project identifier column 3712, a review column 3714, a seconds column 3716, a start column 3718, a task identifier column 3720, a change types column 3722, and a user identifier column 3724.

FIG. 38 is a sample user report in an embodiment of the present disclosure. An administrator (or other user with appropriate user credentials) might download a user report to review user details such as date joined, e-mail address, and name. The report may include an e-mail column 3800, a joined date column 3802, a user level column 3804, a name column 3806, a nickname column 3808, and a user identifier column 3810.

Figure 39:
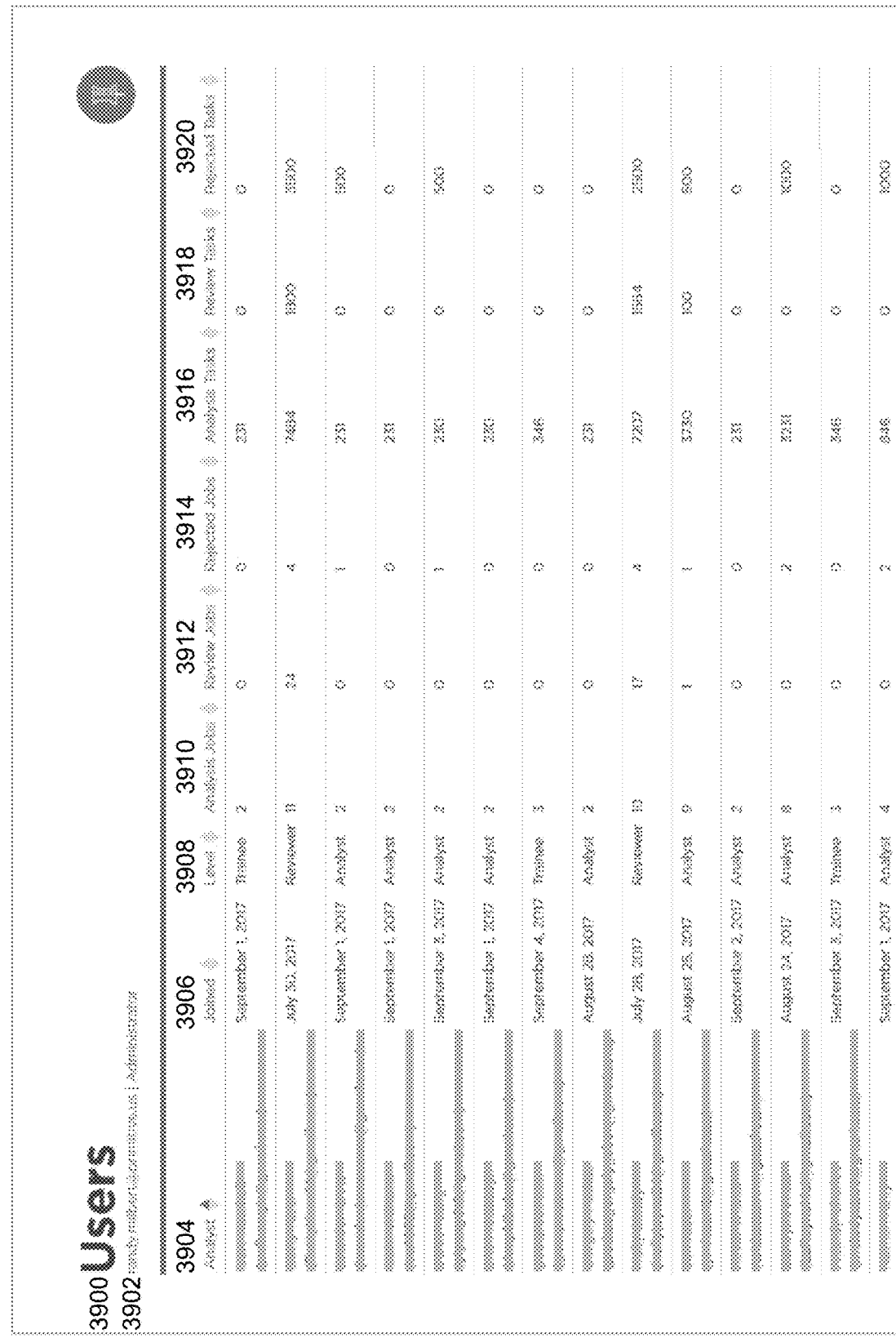
FIG. 39 is a screenshot of a page listing information for all users in an embodiment of the present disclosure.

FIG. 39 is a users page in an embodiment of the present disclosure. One might view the users page to see how users stack up in terms of jobs completed and tasks rejected. The page may include a title element 3900 and a user element 3902 with a link for logging out and a user level. The page may include a table with one or more of an analyst column 3904, a joined date column 3906, a user level column 3908, an analysis job count column 3910, a review job count column 3912, a rejected job count column 3914, an analysis task count column 3916, a review task count column 3918, and a rejected task count column 3920. The table may support sorting by any column.

Figure 40:
FIG. 40 is a screenshot of a page listing information for one user in an embodiment of the present disclosure.

FIG. 40 is a user page in an embodiment of the present disclosure. One might view the user page to see how an individual user is doing (e.g., how many recent job rejections the user has had). The page may include a title element 4000, which may include the user's name. The page may include a user element 4002 with a link for logging out and a user level. The page may include a table with one or more of a date column 4004, a project column 4006, a batch column 4008, a review column 4010, and a status column 4012.

The pages described in the previous paragraphs may include other data or may eliminate certain data described as being included herein. The pages provided are for illustration purposes only and are not intended to be limiting by their appearance or organization illustrated in the figures. Any page can be broken into multiple pages and vice versa.

As will be appreciated by one of skill in the art, the various embodiments of the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment, or an embodiment combining software and hardware aspects. Furthermore, embodiments of the present disclosure may take the form of a computer program product on a computer-readable medium or computer-readable storage medium, having computer-executable program code embodied in the medium, that define processes or methods described herein. A processor or processors may perform the necessary tasks defined by the computer-executable program code. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the context of this disclosure, a computer readable medium may be any medium that can contain, store, communicate, or transport the program for use by or in connection with the systems disclosed herein. The computer-executable program code may be transmitted using any appropriate medium, including but not limited to the internet, optical fiber cable, radio frequency (RF) signals or other wireless signals, or other mediums. The computer readable medium may be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a hard disk, a random access memory (RAM), a read-only memory (ROM), an erasable programmable read-only memory (EPROM or Flash memory), a compact disc read-only memory (CD-ROM), digital video disc (DVD), or the like, or other optical or magnetic storage device. Computer-readable media includes, but is not to be confused with, computer-readable storage medium, which is intended to cover all physical, non-transitory, or similar embodiments of computer-readable media.

Various embodiments of the present disclosure have been described herein with reference to flowchart illustrations and/or block diagrams of methods, apparatus (systems), and computer program products. It is understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a machine having a particular function, such that the code portions, which execute via the processor of the computer or other programmable data processing apparatus, create mechanisms for implementing the functions/acts specified in the flowchart and/or block diagram block or blocks. Alternatively, computer program implemented steps or acts may be combined with operator or human implemented steps or acts in order to carry out an embodiment of the disclosure.

Additionally, although flowcharts have been used herein to illustrate methods comprising sequential steps or processes having a particular order of operations, many of the steps or operations in the flowcharts illustrated herein can be performed in parallel or concurrently, and the flowcharts should be read in the context of the various embodiments of the present disclosure. In addition, the order of the method steps or process operations illustrated in any particular flowchart herein may be rearranged for some embodiments. Similarly, a method or process illustrated in any particular flow chart herein could have additional steps or operations not included therein or fewer steps or operations than those shown. Moreover, a method step may correspond to a method, a function, a procedure, a subroutine, a subprogram, etc.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

Additionally, as used herein, the phrase "at least one of [X] and [Y]," where X and Y are different components that may be included in an embodiment of the present disclosure, means that the embodiment could include component X without component Y, the embodiment could include the component Y without component X, or the embodiment could include both components X and Y. Similarly, when used with respect to three or more components, such as "at least one of [X], [Y], and [Z]," the phrase means that the embodiment could include any one of the three or more components, any combination or sub-combination of any of the components, or all of the components.

In the foregoing description, various embodiments of the present disclosure have been presented for illustration and description. They are not intended to be exhaustive or to limit the invention to the precise form disclosed. Obvious modifications or variations are possible considering the above teachings. The various embodiments were chosen and described to provide an illustration of the principals of the disclosure and their practical application, and to enable one of ordinary skill in the art to utilize the various embodiments with various modifications as are suited to the use contemplated. All such modifications and variations are within the scope of the present disclosure as determined by the appended claims when interpreted in accordance with the breadth they are fairly, legally, and equitably entitled.

What is claimed is:

1. A computer-implemented method of identifying property changes, the method comprising:
   obtaining a first and second imagery from identified electronic sources for each property of a plurality of properties;
   using computer processing components to automatically classify each property based on a comparison of the first and second imagery corresponding to the property to obtain classified properties; and
   providing a subset of the classified properties for review by at least one user and collectively accepting or rejecting all the classified properties based on the review of the subset of classified properties.

2. The method of claim 1, wherein the computer processing components automatically classify a given property to indicate whether the property has changed.

3. The method of claim 2, wherein if the given property is classified as having changed, automatically classifying the property further comprises indicating a property change type.

4. The method of claim 3, further comprising displaying on an electronic display information relating to a tax impact of a change to the given property.

5. The method of claim 1, wherein using computer processing components to automatically classify a given property comprises removing pixels outside of predetermined boundaries of the given property from the first and second imagery for the given property.

6. The method of claim 1, wherein using computer processing components to automatically classify a given property comprises combining bands from the first and second imagery for the given property to construct a third imagery.

7. The method of claim 1, further comprising training the computer processing components to automatically classify using training imagery and classifications from manually classified properties.

8. The method of claim 7, wherein the training imagery is augmented using one or more of the following techniques: random warping, random translation, random scaling, random rotation, random transposing, randomized contrast, and random blurring.

9. A computer-implemented method of identifying property changes, the method comprising:
classifying a plurality of properties by performing, for each property of the plurality of properties, steps of:
a) obtaining old and new imagery of the property from identified electronic sources;
b) displaying on an electronic display to a user the old and new imagery for the property; and
c) electronically receiving from the user through electronic means a classification of the property;
providing a subset of classified properties of the plurality of properties classified for review by at least one user and collectively accepting or rejecting the plurality of properties classified based on the review of the subset of classified properties; and
where the plurality of properties is rejected, reclassifying the plurality of properties.

10. The method of claim 9, wherein the classification of the property is indicative of whether the property has changed.

11. The method of claim 10, wherein if the classification identifies the property has changed, the method further comprises electronically receiving from the user a property change type.

12. The method of claim 9, further comprising displaying a map on an electronic display to a user, the map identifying classifications for at least a subset of the plurality of properties.

13. The method of claim 12, wherein the map comprises a marker for each changed property of the at least a subset of the plurality of properties and each marker is colored to indicate a change type corresponding to the respective property.

14. The method of claim 12, wherein the map distinguishes areas of the map based on amount of change in each area.

15. The method of claim 12, further comprising displaying on an electronic display information relating to change types of the at least a subset of the plurality of properties.

16. The method of claim 9, wherein the old and new imagery of a property each comprise at least one of an overhead or oblique image of the property.

17. A computer-implemented method of identifying property changes, the method comprising:
obtaining a first and second imagery from identified electronic sources for each property of a plurality of properties;
using computer processing components to automatically classify each property based on a comparison of the first and second imagery corresponding to the property;
dividing the classified properties into batches;
for at least one batch, providing a subset of classified properties of the batch for review by at least one user and collectively accepting or rejecting the whole batch based on the review of the subset of classified properties; and
reclassifying rejected batches.

18. The method of claim 17, further comprising displaying a map on an electronic display to a user, the map identifying classifications for at least a subset of the plurality of properties.

19. The method of claim 18, wherein the map comprises a marker for each changed property of the at least a subset of the plurality of properties and each marker is colored to indicate a change type corresponding to the respective property.

20. The method of claim 18, wherein the map distinguishes areas of the map based on amount of change in each area.

* * * * *

UNITED STATES PATENT AND TRADEMARK OFFICE
CERTIFICATE OF CORRECTION

| | | |
|---|---|---|
| PATENT NO. | : 11,004,186 B2 | Page 1 of 1 |
| APPLICATION NO. | : 16/136734 | |
| DATED | : May 11, 2021 | |
| INVENTOR(S) | : Milbert et al. | |

It is certified that error appears in the above-identified patent and that said Letters Patent is hereby corrected as shown below:

On the Title Page

Item [56], in Column 2, Line 1, delete "contorl" and insert --control-- therefor Signed and Sealed this
Third Day of September, 2024

Katherine Kelly Vidal
*Director of the United States Patent and Trademark Office*